United States Patent
Guo et al.

(10) Patent No.: US 11,562,541 B2
(45) Date of Patent: Jan. 24, 2023

(54) TOPOLOGY-CHANGE-AWARE VOLUMETRIC FUSION FOR REAL-TIME DYNAMIC 4D RECONSTRUCTION

(71) Applicant: Board of Regents, The University of Texas System, Austin, TX (US)

(72) Inventors: Xiaohu Guo, Richardson, TX (US); Chao Li, Richardson, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 154 days.

(21) Appl. No.: 17/018,707

(22) Filed: Sep. 11, 2020

(65) Prior Publication Data

US 2021/0082192 A1    Mar. 18, 2021

Related U.S. Application Data

(60) Provisional application No. 62/900,367, filed on Sep. 13, 2019.

(51) Int. Cl.
*G06T 19/00*    (2011.01)
*G06F 16/901*   (2019.01)
*G06T 17/20*    (2006.01)

(52) U.S. Cl.
CPC ........ *G06T 19/006* (2013.01); *G06F 16/9024* (2019.01); *G06T 17/20* (2013.01)

(58) Field of Classification Search
CPC .... G06T 19/006; G06T 17/20; G06F 16/9024
See application file for complete search history.

(56) References Cited

U.S. PATENT DOCUMENTS

| | | | | |
|---|---|---|---|---|
| 9,299,195 | B2 * | 3/2016 | Dou | G01S 17/89 |
| 9,443,350 | B2 * | 9/2016 | Wagner | G06T 17/00 |
| 10,431,000 | B2 * | 10/2019 | Zhang | G06T 7/251 |
| 2018/0033193 | A1 * | 2/2018 | Goel | G06T 15/04 |
| 2018/0350088 | A1 * | 12/2018 | Dou | G06T 7/596 |

OTHER PUBLICATIONS

Sumner, Robert W., Johannes Schmid, and Mark Pauly. "Embedded deformation for shape manipulation." ACM siggraph 2007 papers. 2007. 80-es. (Year: 2007).*

(Continued)

*Primary Examiner* — Xin Sheng
(74) *Attorney, Agent, or Firm* — Talem IP Law, LLP

(57) ABSTRACT

A method for real-time dynamic 4D reconstruction can include detecting one or more topology changes between reconstructed frames and a new incoming frame by detecting a set of discontinuities in a first surface mesh associated with the reconstructed frames; duplicating cells of a first volumetric cell structure associated with the reconstructed frames at the set of discontinuities to generate a set of nodes, the set of nodes having a non-manifold connectivity; and fusing a depth image of the new incoming frame with the first volumetric cell structure having the set of nodes to form a next volumetric cell structure with the non-manifold connectivity. A next surface mesh extracted from the next volumetric cell structure can then be output for rendering a live frame.

16 Claims, 22 Drawing Sheets

(56) References Cited

OTHER PUBLICATIONS

Tao Yu et al., "DoubleFusion: Real-time Capture of Human Performances with Inner Body Shapes from a Single Depth Sensor" Proceedings of the IEEE Conference on Computer Vision and Pattern Recognition, 2018, pp. 7287-7296.
Tao Yu et al., "BodyFusion: Real-time Capture of Human Motion and Surface Geometry Using a Single Depth Camera" Proceedings of the IEEE International Conference on Computer Vision, 2017, pp. 910-919.
Konstantinos Zampogiannis et al., "Topology-Aware Non-Rigid Point Cloud Registration", IEEE Transactions on Pattern Analysis and Machine Intelligence, Nov. 3, 2019, 14 pages.
Andriy Myronenko et al., "Point Set Registration: Coherent Point Drift" IEEE Trans. on Pattern Analysis and Machine Intelligence, 2010, pp. 2262-2275, vol. 32, issue 12.
Aggeliki Tsoli et al., "Tracking deformable surfaces that undergo topological changes using an RGB-D camera" 2016 Fourth International Conference on 3D Vision (3DV), 2016, pp. 333-341.
Ravi Garg et al., "A Variational Approach to Video Registration with Subspace Constraints" International Journal of Computer Vision, 2013, pp. 286-314, vol. 104, Issue 3, Springer.
Kaiwen Guo et al., "Real-time Geometry, Albedo, and Motion Reconstruction using a Single RGBD Camera" ACM Transactions on Graphics, Mar. 2017, 13 pages, vol. 36, Issue 3, Article No. 32.
Mingsong Dou et al., "Motion2Fusion: Real-time Volumetric Performance Capture", ACM Transactions on Graphics, Oct. 2017, 16 pages, vol. 1, Issue 1, Article No. 246.
Nathan Mitchell et al., "Non-manifold Level Sets: A multivalued implicit surface representation with applications to self-collision processing" ACM Transactions on Graphics, 2015, 9 pages.
Chao Li et al., "ArticulatedFusion: Real-time Reconstruction of Motion, Geometry and Segmentation Using a Single Depth Camera" Proceedings of the European Conference on Computer Vision (ECCV), 2018, pp. 317-332.
Matthias Innmann et al., "VolumeDeform: Real-time Volumetric Non-rigid Reconstruction" European Conference on Computer Vision, 2016, pp. 362-379. Springer.
Richard A. Newcombe et al., "DynamicFusion: Reconstruction and Tracking of Non-rigid Scenes in Real-Time" Proceedings of the IEEE conference on computer vision and pattern recognition, 2015, pp. 343-352.
Mingsong Dou et al., "Fusion4D: Real-time Performance Capture of Challenging Scenes" ACM Transactions on Graphics, 2016, 13 pages, vol. 35, Issue 4, Article No. 114.
Lan Xu et al., "FlyFusion: Realtime Dynamic Scene Reconstruction Using a Flying Depth Camera" IEEE Transactions on Visualization & Computer Graphics, Jul. 29, 2019, 12 pages.
Miroslava Slavcheva et al., "KillingFusion: Non-rigid 3D Reconstruction without Correspondences" Proceedings of the IEEE Conference on Computer Vision and Pattern Recognition, 2017, pp. 1386-1395.
Szymon Rusinkiewicz et al., "Efficient Variants of the ICP Algorithm" 3dim, 2001, pp. 145-152, vol. 1.
Gerard Pons-Moll et al., "Multisensor-Fusion for 3D Full-Body Human Motion Capture" 2010 IEEE Computer Society Conference on Computer Vision and Pattern Recognition, 2010, pp. 663-670.

* cited by examiner

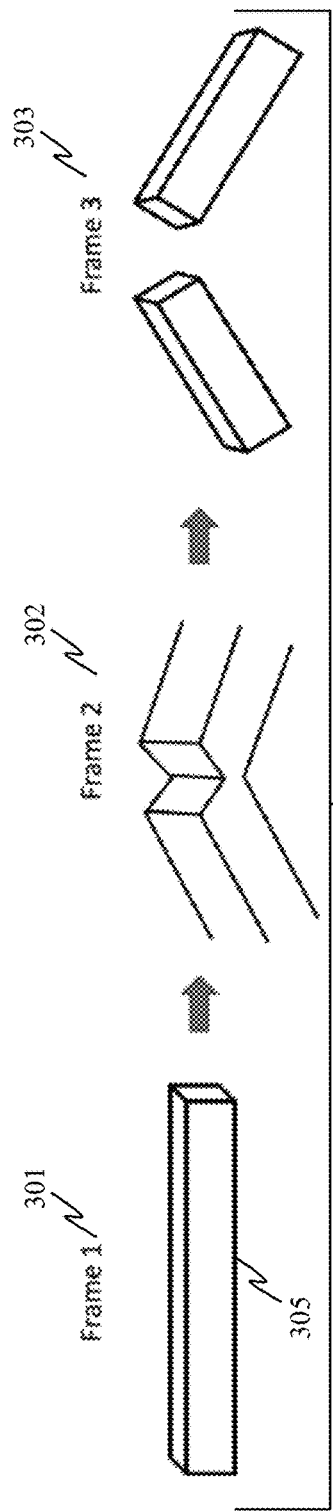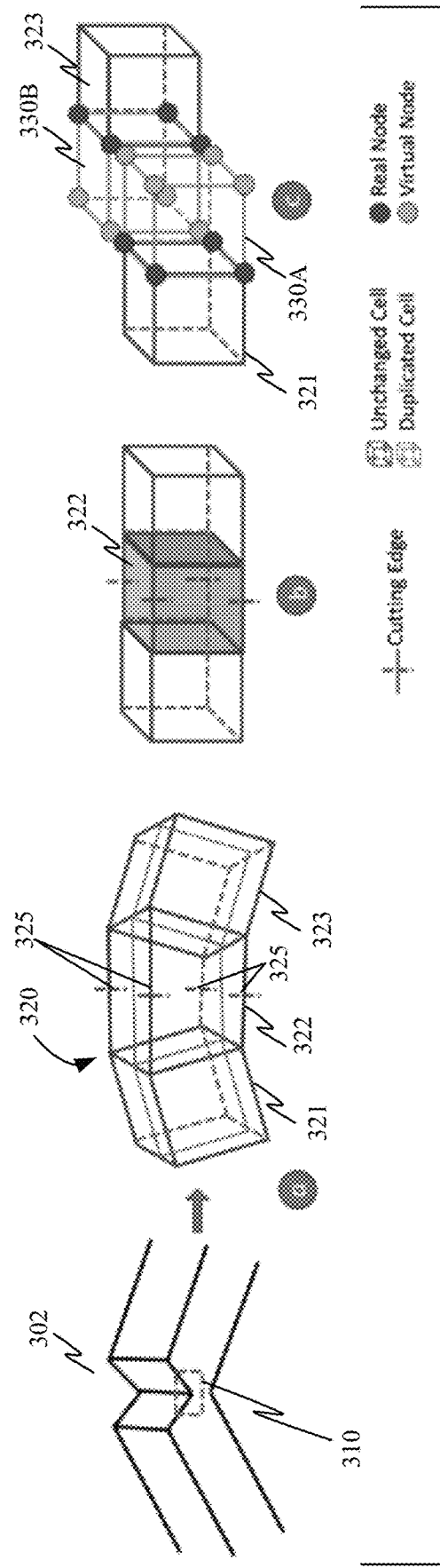
Figure 3A
Figure 3B

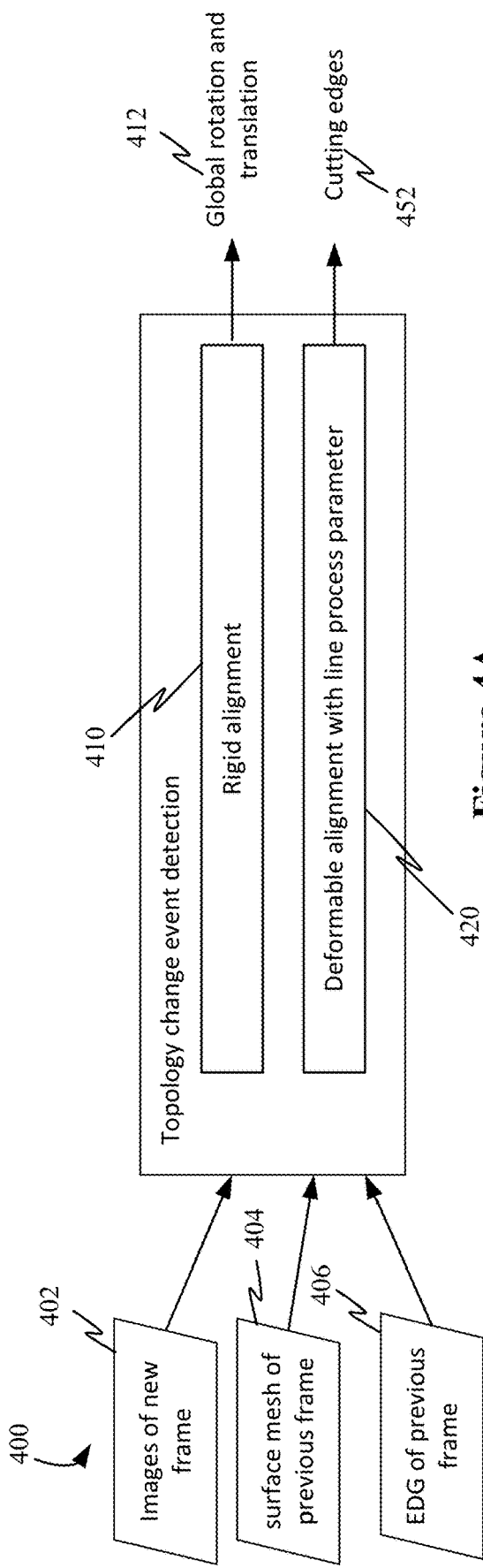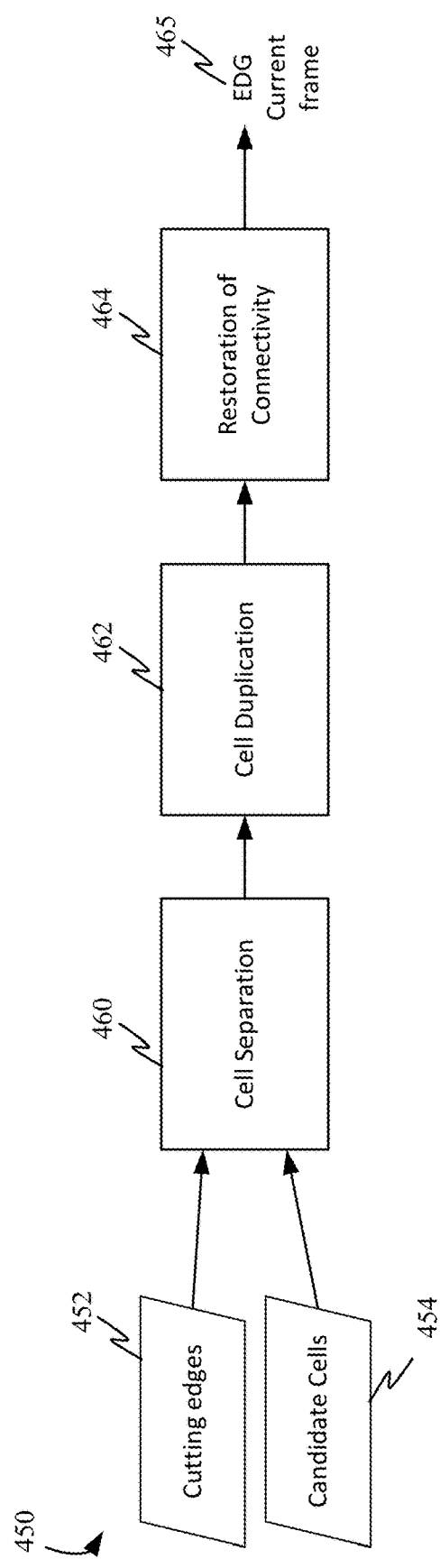
Figure 4A
Figure 4B

TOPOLOGY-CHANGE-AWARE VOLUMETRIC FUSION FOR REAL-TIME DYNAMIC 4D RECONSTRUCTION

CROSS-REFERENCE TO RELATED APPLICATION

The present invention claims the benefit of U.S. Provisional Application Ser. No. 62/900,367, filed Sep. 13, 2019, which is hereby incorporated by reference in its entirety, including any figures, tables, and drawings.

BACKGROUND

With the latest advancements of consumer-level RGB-D cameras, such as Microsoft KINECT, Asus XTION PRO, and Intel REALSENSE, as well as emerging consumer-level RGB-D cameras equipped on mobile devices, there is a growing interest of developing 4D (space+time) volumetric capture technology for reconstruction dynamic scenes such as human bodies and their surrounding environments. The state-of-the-art techniques such as DynamicFusion [Newcombe, R. A., Fox, D., Seitz, S. M.: DynamicFusion: Reconstruction and tracking of non-rigid scenes in real-time. In: Proceedings of the IEEE conference on computer vision and pattern recognition. pp. 343-352 (2015); "Newcombe et al. 2015", Fusion4D [Dou, M., Khamis, S., Degtyarev, Y., Davidson, P., Fanello, S. R., Kowdle, A., Escolano, S. O., Rhemann, C., Kim, D., Taylor, J., et al.: Fusion4D: Real-time performance capture of challenging scenes. ACM Transactions on Graphics 35(4), 114 (2016); "Dou et al. 2016"], and Motion2Fusion [Dou, M., Davidson, P., Fanello, S. R., Khamis, S., Kowdle, A., Rhemann, C., Tankovich, V., Izadi, S.: Motion2Fusion: Real-time volumetric performance capture. ACM Transactions on Graphics (TOG) 36(6), 246 (2017) "Dou et al. 2017"] allow the 4D reconstruction in real-time, by incrementally fusing the captured geometry into a volume encoded by Truncated Signed Distance Fields (TSDF) while capturing the dynamic motion of the scene with an Embedded Deformation Graph (EDG).

A fundamental difficulty with 4D reconstruction (space+time) relies on the real-time reconstruction part. The most popular method is to use a pre-defined template, such as a skeleton [Yu, T., Guo, K., Xu, F., Dong, Y., Su, Z., Zhao, J., Li, J., Dai, Q., Liu, Y.: BodyFusion: Real-time capture of human motion and surface geometry using a single depth camera. In: Proceedings of the IEEE International Conference on Computer Vision. pp. 910-919 (2017) "Yu et al. 2017"], or pre-scanned geometry [Zollhofer, M., NieBner, M., Izadi, S., Rehmann, C., Zach, C., Fisher, M., Wu, C., Fitzgibbon, A., Loop, C., Theobalt, C., et al.: Real-time non-rigid reconstruction using an rgb-d camera. ACM Transactions on Graphics (ToG) 33(4), 156 (2014) "Zollhöfer et al. 2014"] as prior knowledge, and reconstruct human body parts such as face [Li et al.: Realtime facial animation with on-the-fly correctives. ACM Trans. Graph. 32(4), 42-1 (2013)], hands [Tkach et al.: Sphere-meshes for real-time hand modeling and tracking. ACM Transactions on Graphics (TOG) 35(6), 222 (2016)], and body [Pons-Moll, G., Baak, A., Helten, T., Müller, M., Seidel, H. P., Rosenhahn, B.: Multisensor-fusion for 3d full-body human motion capture. In: 2010 IEEE Computer Society Conference on Computer Vision and Pattern Recognition. pp. 663-670. IEEE (2010) "Pons-Moll et al. 2010"]. To eliminate the dependency on geometry priors, some template-less methods were proposed to utilize more advanced structure to merge and store geometry information across the entire motion sequence, such as DynamicFusion [Newcombe et al. 2015], VolumeDeform [Innmann, M., Zollhöfer, M., NieBner, M., Theobalt, C., Stamminger, M.: VolumeDeform: Real-time volumetric non-rigid reconstruction. In: European Conference on Computer Vision. pp. 362-379. Springer (2016) "Innmann et al. 2016"], Fusion4D [Dou et al. 2016], and Motion2Fusion [Dou et al. 2017]. However, most of the existing dynamic reconstruction methods using a single RGB-D camera are still very fragile, with severely degraded reconstructed geometry under the circumstances of occlusion or fast motion and have challenges with topology changes.

This second aspect—the topology change handling—has not been addressed by existing methods. That is, none of the existing methods can handle topological changes in the fused geometry, causing the deformation fields that the system can reconstruct to be limited. Currently, the real-time template-less dynamic 4D reconstruction methods [Newcombe et al. 2015, Innmann et al. 2016, Dou et al. 2016, Yu et al. 2017, Guo et al.: Real-time Geometry, Albedo, and Motion Reconstruction using a Single RGB-D Camera. *ACM Transactions on Graphics* 36, 3, Article No. 32 (2017), Dou et al. 2017, Li et al.: ArticulatedFusion: Real-time reconstruction of motion, geometry and segmentation using a single depth camera. In: Proceedings of the European Conference on Computer Vision (ECCV). pp. 317-332 (2018), and Yu et al.: DoubleFusion: Real-time capture of human performances with inner body shapes from a single depth sensor. In: Proceedings of the IEEE Conference on Computer Vision and Pattern Recognition. pp. 7287-7296, (2018)] use a Truncated Signed Distance Field (TSDF) as the underlying surface representation during the whole reconstruction process. There are two reasons for such preference of TSDF over the traditional representation of meshes or point clouds: (1) The fusion of each depth image into TSDF does not need to worry about the topology of the fused surface in canonical space. In contrast, handling incremental fusion of meshes and point clouds face severe topological uncertainty whenever the incoming new depth image contains noises in geometry. (2) The geometric fusion into TSDF represented by volumetric grids can be efficiently parallelized on a graphics processing unit (GPU).

However, there exists a conflict between the use of fixed connectivity in TSDF volume grids and the discontinuity of deformation fields because the scenes being reconstructed are dynamic, meaning that the deformation field defined on the TSDF volume could be discontinuous, which cannot be represented with fixed connectivity TSDF grids.

BRIEF SUMMARY

Topology-Change-Aware volumetric fusion for 4D reconstruction is described. A new data structure is presented that supports topological changes in a canonical representation used in volumetric fusion methods for 4D reconstruction. Instead of a fixed canonical representation, the structure is allowed to break. That is, non-manifold connectivity is permitted in the canonical representations.

A method for real-time dynamic 4D reconstruction can include detecting one or more topology changes between reconstructed frames and a new incoming frame, wherein the reconstructed frames produce a first surface mesh, a first deformation grid, and a first volumetric cell structure representing a canonical volume reconstructed from images of previous frames. The one or more topology changes can be detected as a set of discontinuities in the first surface mesh as determined using the first deformation grid. The method further includes duplicating cells of the first volumetric cell structure at the set of discontinuities to generate a set of nodes, wherein the set of nodes have a non-manifold connectivity; and fusing a depth image of the new incoming frame with the first volumetric cell structure having the set of nodes to form a next volumetric cell structure, wherein the new incoming frame produces a next surface mesh, a next deformation grid, and the next volumetric cell structure. The next surface mesh and the next deformation grid can be used to generate a live frame in any suitable application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A and 3B illustrate a duplicating operation and generation of a set of nodes based on detection of topology changes in a sequence of frames.

FIG. 4A shows a process for topology change event detection.

FIG. 4B shows a process flow for a non-manifold embedded deformation graph connectivity update.

FIG. 16A shows RGB images of a starting frame and live frame for reference; and FIGS. 16B-16D show a comparison of the topology-change-aware volumetric fusion method described herein (16B), compared with VolumeDeform (16C) and KillingFusion (16D).

DETAILED DESCRIPTION

Topology-Change-Aware volumetric fusion for 4D reconstruction is described. A new data structure is presented that supports topological changes in a canonical representation used in volumetric fusion methods for 4D reconstruction. Instead of a fixed canonical representation, the structure is allowed to break. That is, non-manifold connectivity is permitted in the canonical representations used in 4D reconstruction.

In the classic volumetric fusion-based framework, a mesh is usually extracted from a Truncated Signed Distance Field (TSDF) volume as the canonical surface representation to help estimating a deformation field. The philosophy of volumetric fusion based reconstruction is to decompose the 4D information into representations of 3D-space and 1D-time individually: The 3D-space geometry of the scene is represented in a canonical volume encoded by the TSDF; the 1D time-varying information is represented by the transformations on the nodes of an Embedded Deformation Graph (EDG). Such separated treatment of 3D-space and 1D-time information brings conflicts whenever there is a topological change happening in the scene. Topological changes of the closed-to-open type (i.e., from connected to separated) are challenging to address, but are ubiquitous in dynamic scenes involving human activities—lifting an object from a table, from crossing hands to separated hands, and from wearing outer-wear or accessories to taking-off outerwear or accessories, as a few examples. Conventionally, the TSDF volume of the canonical volume representing the 3D-space geometry is of a fixed connectivity, while the 1D-time information encodes deformation that is discontinuous over 3D space (topological change from closed to open). As previously mentioned, such conflict makes the existing volumetric fusion techniques unable to handle topological changes happening in dynamic scenes.

A method of topology-change-aware volumetric fusion is provided that introduces non-manifold connectivity to capture topological changes at the tip of a crack surface. Instead of a fixed Cartesian grid structure for the TSDF, the distance fields are defined on a hexahedral mesh that allows for multiple overlapping cells associated with geodesically-distant regions.

Capturing scenes for a virtual reality or augmented reality real-time interaction for meeting applications, gaming applications, and even movie production can be possible through suitable reconstruction algorithms. By incorporating topology-change-aware volumetric fusion for dynamic scene reconstruction as described herein, such applications may be possible when using a single RGB-D camera to capture the scene.

Figure 1A:
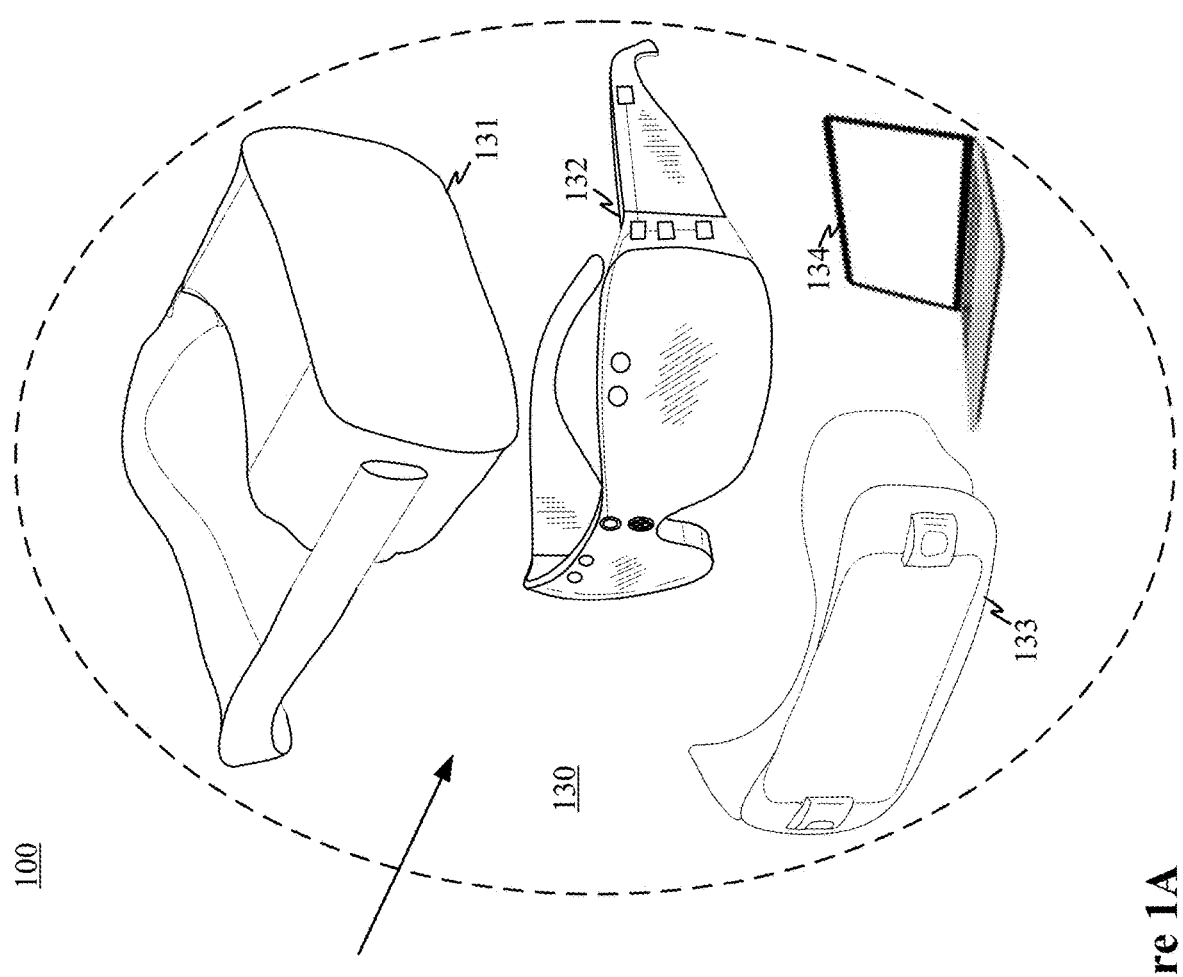
FIG. 1A illustrates an operating environment for real-time dynamic 4D reconstruction with topology-change-aware volumetric fusion.
Figure 1A:
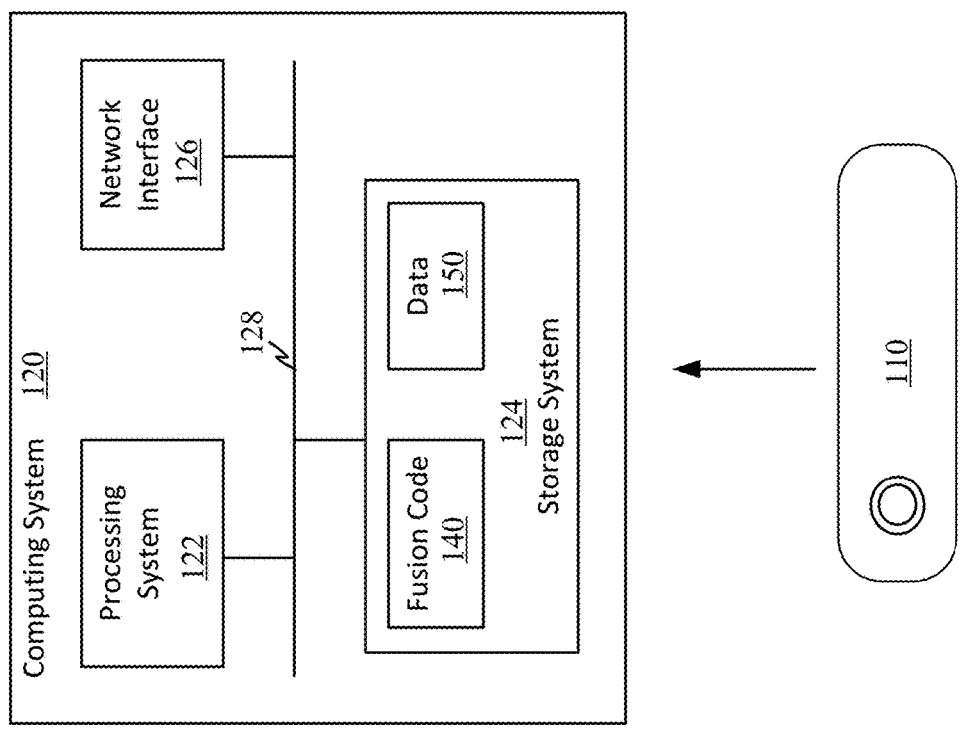

FIG. 1A illustrates an operating environment for real-time dynamic 4D reconstruction with topology-change-aware volumetric fusion. Referring to FIG. 1A, an operating environment 100 for topology-change-aware volumetric fusion includes a single RGB-D camera 110, a computing system 120 and a display 130.

The RGB-D camera 110 is any suitable camera physically located to capture a scene. Examples of suitable cameras include, but are not limited to, Microsoft KINECT, Asus XTION PRO, and Intel REALSENSE.

The computing system 120 includes a processing system 122, storage system 124, and network interface 126, which may communicate with each other via system bus 128.

The processing system 122 includes one or more hardware processors. The one or more hardware processors can include a graphics processing unit (GPU) or other parallel processors. In some cases, processing system 122 can implement or utilize a compute unified device architecture platform (CUDA) available from NVIDIA corporation.

Storage system 124 may be implemented as a single storage device but may also be implemented across multiple storage devices or sub-systems co-located or distributed relative to each other. Storage system 124 may include additional elements, such as a controller, capable of communicating with processing system 122. The storage system 124 may include storage media in the form of volatile memory and/or nonvolatile memory embodied in removable media and/or non-removable media implemented in any method or technology for storage of information, such as computer readable instructions, data structures, program modules, or other data, including fusion code 140 and data 150. Examples of storage media of storage system 124 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Fusion code 140 includes instructions for performing a method for real-time dynamic 4D reconstruction as described herein. Data 150 can include images (e.g., from RGB-D camera 110) and models used by the instructions of fusion code 140. The models may be stored in the form of data structures that support topological changes in a canonical representation used in volumetric fusion methods for the 4D reconstruction by fusion code 140. Details on the data structures are discussed in the sections entitled EDG data structure and TSDF data structure (with representational figure of EDG data structure shown in FIG. 5A).

Network interface 126 includes communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems.

Display 130 can be implemented by any virtual reality (VR) or augmented reality headset or device (e.g., via projection onto a surface, a holographic display or projection, or screen) or be implemented by a computer monitor (which may in some cases be a mobile device screen that itself can be attached to a headset). The device implementing display 130 can execute or be in communication with a device executing an application receiving and using the surface mesh of each frame. Examples for display 130 include, but are not limited to a VR headset 131 such as made by Oculus, Sony, or HTC; an augmented reality headset 132 such as made by Microsoft or Magic Leap; a phone-based virtual reality headset 133 such as made by Google and Samsung (for use with compatible phones); and any computing device, such as a laptop 134, tablet, mobile phone, etc.

The computing system 120 can receive images from the RGB-D camera 110 and transmit a reconstructed surface mesh to the device implementing the display 130 via the network interface 126. The communication may be through wired or wireless means. In an alternative implementation, some or all of the components of computing system 120 may be incorporated in a device containing the RGB-D camera 110 and/or a device implementing the display 130.

Figure 1B:
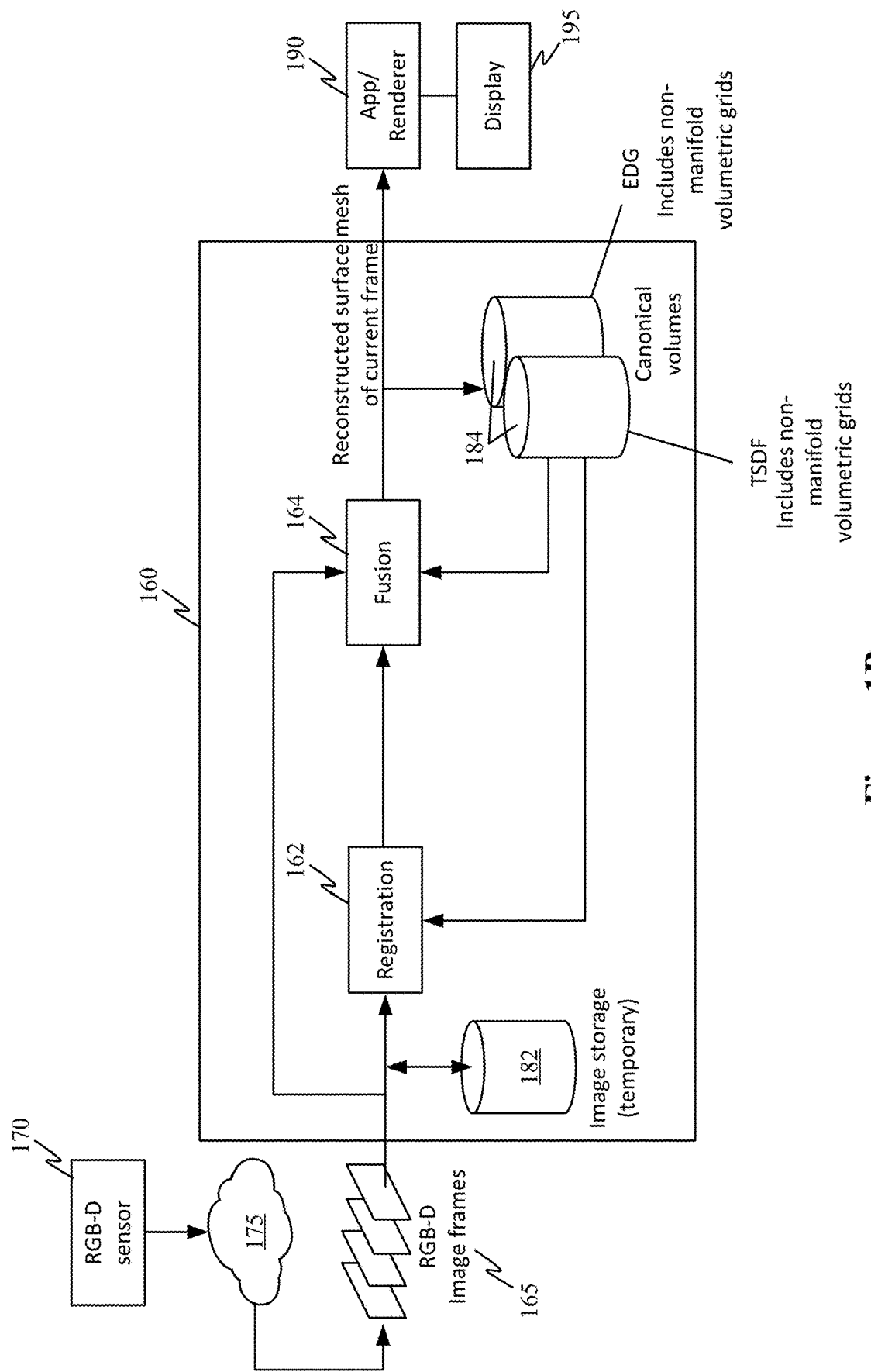
FIG. 1B shows an example implementation of a system for real-time dynamic 4D reconstruction.

FIG. 1B shows an example implementation of a system for real-time dynamic 4D reconstruction. Referring to FIG. 1B, a system 160 for topology-change-aware volumetric fusion can include a registration module 162 and a fusion module 164 (the two of which may be embodied as fusion code 140 stored in a storage system 124 and executed by processing system 122 as described with respect to FIG. 1A). Registration module 162 receives images 165 (e.g., as RGB-D image frames) from an RGB-D sensor 170 (which may be embodied as RGB-D sensor 110 of FIG. 1A). The images 165 may be received over a network 175. Network 175 may be, but is not limited to, a cellular network (e.g., wireless phone), a point-to-point dial up connection, a satellite network, the Internet, a local area network (LAN), a wide area network (WAN), a WiFi network, an ad hoc network, or a combination thereof.

The received images 165 can be stored, at least temporarily in an image storage 182 (which may be part of storage system 124 described with respect to FIG. 1A). Color images and depth images can be used by the registration module 162 and the depth images can be used by the fusion module 164. In operation, the registration module 162 receives a new RGB-D image including a color image and a depth image of a current frame, a color image from a previous frame, and a previous surface mesh extracted from a canonical volume deformed by the previous frame and stored in a storage resource 184 (e.g., as data 150 stored in storage system 124); and performs a topology-change-aware registration process to output, to the fusion module 164, a registered surface mesh deformed to the images of the current frame and an estimated deformation field.

The fusion module 164 receives the registered surface mesh deformed to the images of the current frame, the estimated deformation field, the depth image of the current frame, and the canonical volume deformed by the previous frame; and performs an image fusion process to update the canonical volume stored in the storage resource 184.

Storage resource 184 can store information of the canonical volume (e.g., TSDF and/or associated EDG grids, which may be stored together or separately). As mentioned above, the described canonical volumes include grids with non-manifold connectivity.

An output of the fusion module 164 (e.g., a surface mesh extracted from the updated canonical volume) can be transmitted to an application 190 for rendering a live frame at a display 195 (which may be implemented as described with respect to display 130 of FIG. 1A). Application 190 may be a virtual reality, augmented reality, gaming, or meeting application, as some examples. Although not shown, the communication of the output of the fusion module 164 to a device executing the application 190 and providing display 195 may be over a network such as described with respect to network 175. Such a communication may be via a same network or a different network.

Figure 2:
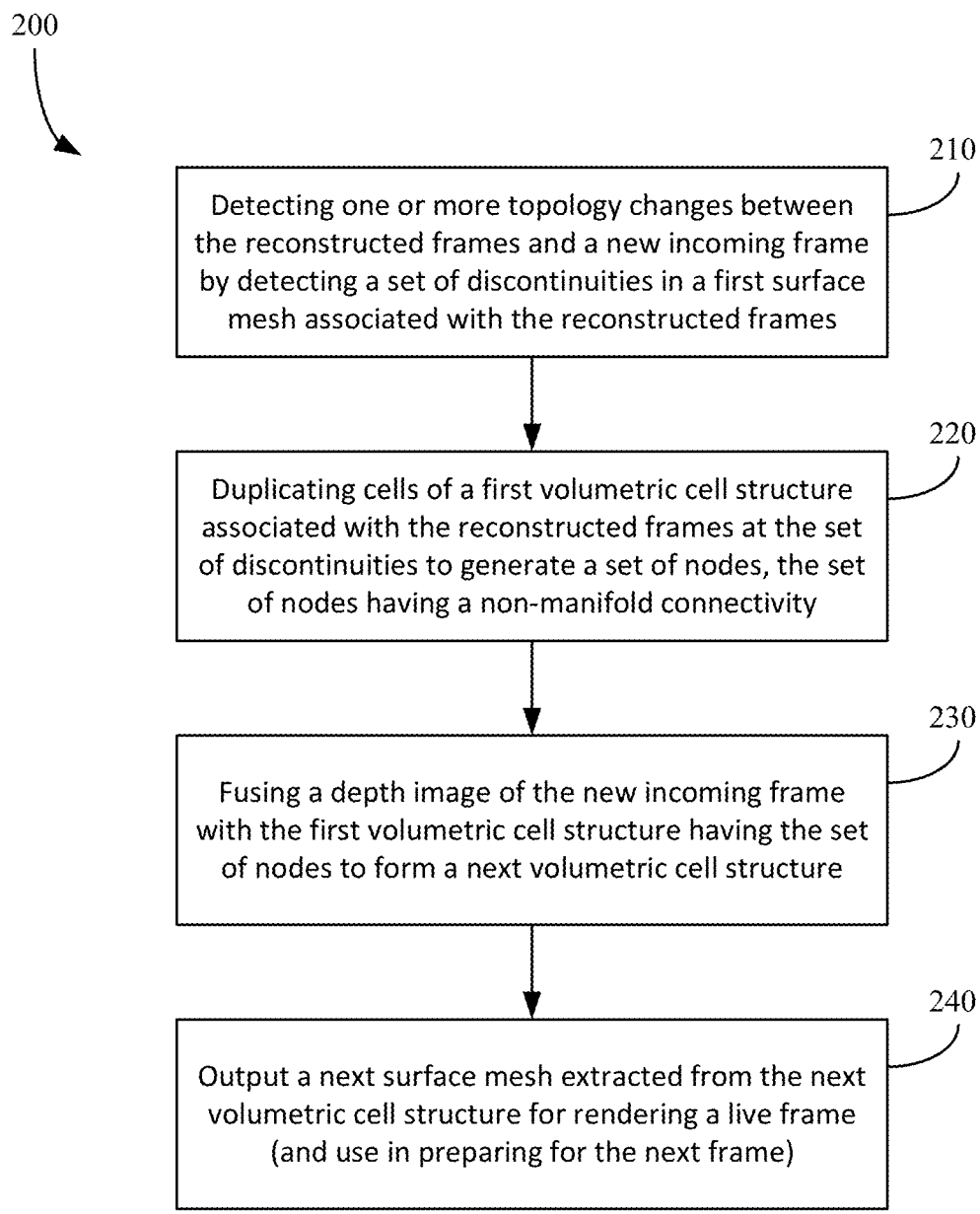
FIG. 2 illustrates a method for topology-change-aware volumetric fusion.

FIG. 2 illustrates a method for topology-change-aware volumetric fusion.

Referring to FIG. 2, method 200 includes detecting (210) one or more topology changes between the reconstructed frames and a new incoming frame. The detecting 210 can be accomplished by detecting a set of discontinuities in a first surface mesh associated with the reconstructed frames. Here, the reconstructed frames produce a first surface mesh, a first deformation grid, and a first volumetric cell structure representing a canonical volume reconstructed from images of the previous frames. The method 200 can further include duplicating (220) cells of the first volumetric cell structure at the set of discontinuities to generate a set of nodes, wherein the set of nodes have a non-manifold connectivity; and fusing (230) a depth image of the new incoming frame with the first volumetric cell structure having the set of nodes to form a next volumetric cell structure. Here, the new incoming frame produces a next surface mesh, a next deformation grid, and the next volumetric cell structure. The next surface mesh can then be output (240) for rendering a live frame by a virtual reality, augmented reality, gaming, or meeting application. The next surface mesh is also provided to the registration module 162 for use as the previous surface mesh for the next incoming frame.

The detecting operation 210 can be performed by a topology-change-aware registration module such as described with respect to registration module 162 of FIG. 1B; and the duplicating cells of the first volumetric cell structure operation 220, fusing operation 230, and output operation 240 can be performed by a topology-change-aware geometric fusion module such as described with respect to fusion module 164 of FIG. 1B.

FIGS. 3A and 3B illustrate a duplicating operation and generation of a set of nodes based on detection of topology changes in a sequence of frames. Referring to FIG. 3A, a sequence of frames 301, 302, 303 may reflect a closed-to-open topology change in a scene, in particular, a bar 305 that is torn open in the consecutive frames 301, 302, 303. FIG. 3B illustrates a corresponding canonical volume (which may be the deformation grid or the volumetric cell structure described in operation 220 of FIG. 2) for the intermediate live frame 302. A representation of the grid in region 310 is shown as volume portion 320 of the live frame, which is illustrated with three cells: first cell 321, second cell 322, and third cell 323. Cutting edges 325 are shown at four edges of the second cell 322. Based on the identification of these cutting edges, the cell in the previous volume that is to be duplicated is determined—in this case the second cell 322 is determined to be the cell to be duplicated based on the edge cutting in the canonical space. The duplicating of the second cell 322 generates a set of nodes, that once reconnected result in real nodes and virtual nodes forming final non-manifold cells 330A, 330B (here two virtual nodes are included in the cell connected to the original first cell 321 and two virtual nodes are included in the cell connected to the original third cell 323). The non-manifold cells 330A, 330B are illustrated with a small displacement to distinguish the two cells that are actually at the same location.

The above-described duplicating operation is also performed during the topology-change-aware registration (e.g., by module 162 of FIG. 1B) as a preliminary step to updating the first volumetric cell structure. In particular, topological changes are detected and the deformation grid (e.g., the EDG) is updated.

FIG. 4A shows a process for topology change event detection and FIG. 4B shows a process flow for a non-manifold embedded deformation graph connectivity update.

Referring to FIG. 4A, when a new frame is received, motion in an image of the incoming frame can be estimated by process 400. Process 400 can begin with receipt of images of a new frame 402, surface mesh of a previous frame 404 and EDG of the previous frame 406. Then, a rigid alignment (410) is performed to compute/calculate inter-frame global rotation and global translation 412 and a deformable alignment (420) that incorporates a line process parameter to account for discontinuities between neighboring nodes is performed. The deformable alignment process 420 involves a non-linear optimization problem that solves for rotation angles, displacements, and line processes. After optimization, the edges identified in the previous frame as having a discontinuity between neighboring nodes can be flagged as "to-be-cut" (e.g., cutting edges 452) in the current frame.

To support real-time dynamic 4D reconstruction using volumetric fusion, the cells of volumetric structure are allowed to duplicate themselves, and nodes (or grid points) are allowed to have non-manifold connectivity. In EDG $\mathcal{G}$, each cell $c^{\mathcal{G}}$ has exactly 8 nodes $\{g^{\mathcal{G}}\}$ located at its corners. Each node $g^{\mathcal{G}}$ can be affiliated with up to 8 cells $\{c^{\mathcal{G}}\}$ in the manifold case. At the beginning of the 4D reconstruction, it is assumed that all connectivity between nodes are manifold, i.e., all nodes are affiliated with 8 cells except for those on the boundary of volume.

Referring to FIG. 4B, the non-manifold EDG connectivity update 450 includes three steps and begins with receipt of a set of cutting edges 452 detected by the method 400 for topology change event detection (e.g., using a deformation field estimation); and a set of candidate cells 454 to be duplicated based on the cutting edge detection.

The first step includes cell separation (460). Cell separation of each candidate cell $c^{\mathcal{G}}$ is performed by removing cutting edges that were detected by topology event detection and computing candidate cell connected components (CCs).

The second step includes cell duplication (462). Cell duplication is based on the connected components, forming real nodes (from original cell) and virtual nodes (added to make up the duplicated cells). The candidate cells are duplicated depending on their number of CCs. In each duplicated cell $c^{(d)}$, its nodes are categorized into two types: (1) Real Nodes $\{g^{(r)}\}$ being those from the original cell before duplication, and (2) Virtual Nodes $\{g^{(v)}\}$ being those added to make up the duplicated cells. For each virtual node $g^{(v)}$, it will only be affiliated with its duplicated cell. The transformation of each duplicated node in the EDG is also determined. For real nodes, the duplicated node can inherit all properties from the original nodes. For virtual nodes, their displacement can be extrapolated from real nodes belonging to the same cell. For example, with reference to FIG. 3B, there are 4 cutting edges on the second cell 322 ($c^{\mathcal{G}}$) causing its 8 nodes to be separated into 2 CCs, thus the original cell $c^{\mathcal{G}}$ is replaced with 2 duplicated cells 330A, 330B $\{c^{(d)}\}$ residing at the same location of canonical space.

The third step includes restoration of connectivity (464). Here, for any pair of geometrically adjacent duplicated cells $c^{\mathcal{G}}$ (in the canonical space), given two nodes from them respectively, the two nodes are merged if: (1) they are both real nodes and copied from the same original node, or (2) they are both virtual nodes, copied from the same original node and connected with the same real nodes. In the example of FIG. 3B all four nodes on the left face of the front cell 330A are merged with four nodes of the left/first cell 321 by the node-merging rules. After restoring the connectivity, the final EDG 465 (which can be considered the EDG for the current frame) has been fully assembled, respecting the topology change of the target RGB-D image. It can be appreciated that after a few edge cutting and cell duplication operations, the connectivity of nodes will become non-manifolds.

Figure 4C:
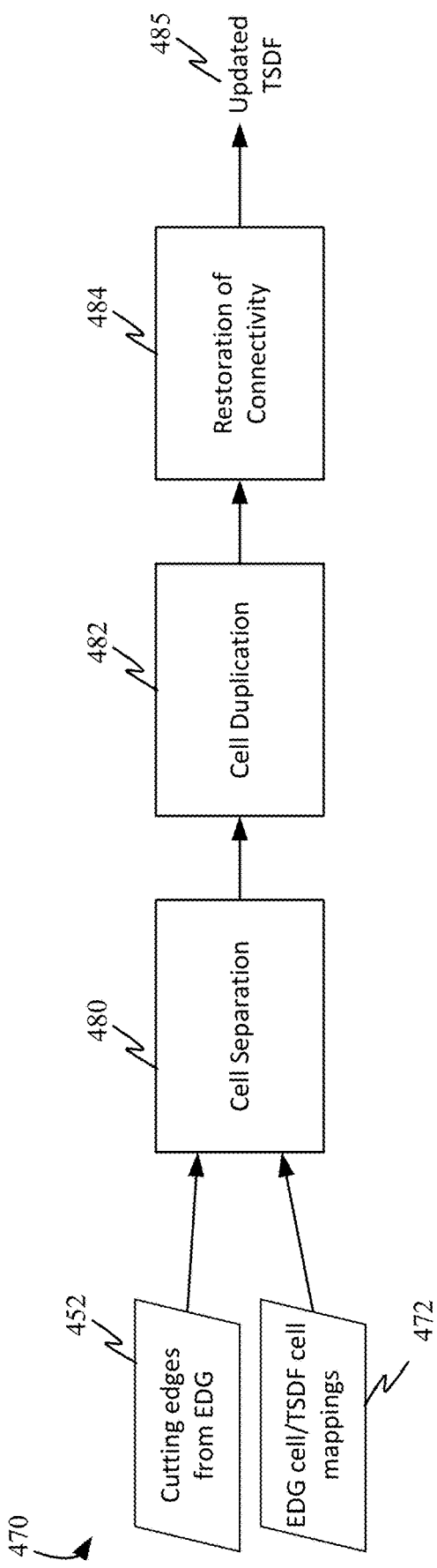
FIG. 4C shows a process flow for updating a TSDF volumetric cell structure based on detected topological changes.
Figure 4D:
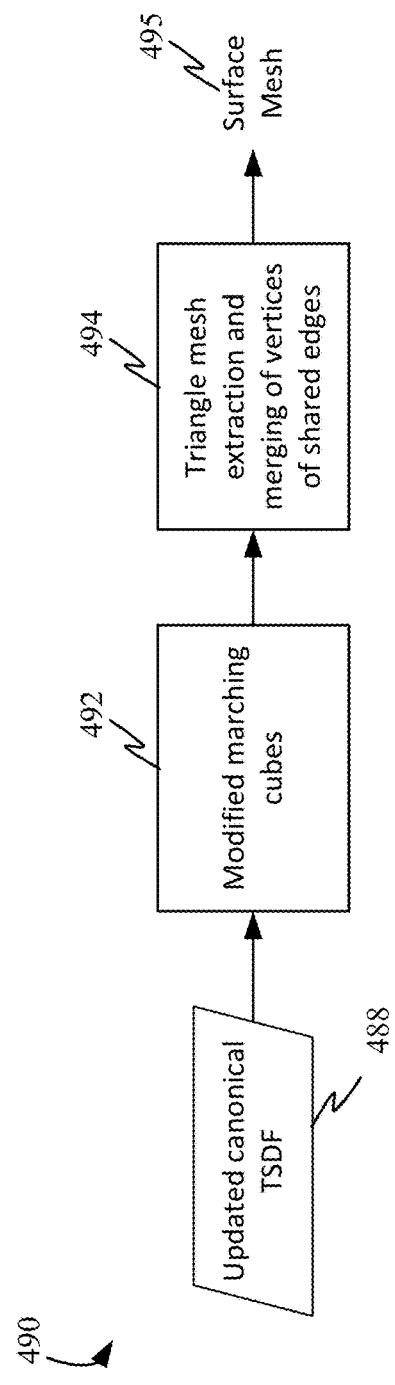
FIG. 4D shows a process flow for a surface mesh extraction from TSDF.

FIG. 4C shows a process flow for updating a TSDF volumetric cell structure based on detected topological changes and FIG. 4D shows a process flow for a surface mesh extraction from TSDF.

Referring to FIG. 4C, updating a TSDF volumetric cell structure based on detected topological changes involves duplicating cells of the TSDF volumetric cell structure at the set of discontinuities such as detected in process 400 of FIG. 4A and propagating connectivity of the final EDG 465 as generated in process 450. The TSDF volumetric cell structure can become non-manifold after this process.

Similar to the process shown in FIG. 4B, three steps can be performed to propagate the connectivity of the EDG to the TSDF volume. Here, a non-manifold update to the TSDF 470 can begin with receipt of EDG cells and their embedded TSDF volume cells 472 and the set of cutting edges in the EDG 452 such as used in the method 450.

In the first step, cell separation (480) is performed. The mapping obtained from input 472 can be used to identify one or more cells of the TSDF volume located in a same space as the EDG cells. For the EDG cells previously identified as being connected components and having the cutting edges, this information can be directly transferred via the mapping to identify connected components (CCs) and cutting edges of the TSDF cells.

In the second step, cell duplication (482) based on the TSDF CCs is performed in the same manner as that described in operation 462. That is, cell duplication is based on the connected components, forming real nodes (from original cell) and virtual nodes (added to make up the duplicated cells). The candidate cells are duplicated depending on their number of CCs (and in this case are duplicated depending on the number of CCs of an EDG cell). In each duplicated cell, its nodes are categorized into two types: (1) Real Nodes—being those from the original cell before duplication, and (2) Virtual Nodes—being those added to make up the duplicated cells. For real nodes, each real node has its TSDF value inherited from the original cell, which maintains continuity of their TSDF. (2) For all virtual nodes that are connected to real nodes, if their connected real node has negative TSDF value (meaning inside the surface), the TSDF of the corresponding virtual node is set by negating that value, i.e. $-d \rightarrow +d$. (3) For all remaining virtual nodes that have not been assigned TSDF values, their values are set as $+1$.

In the third step, connectivity is restored (484). Here, for any pair of geometrically adjacent duplicate cells in the canonical space, the two nodes are merged if they are copied from the same original node and they are: (1) both real nodes, or (2) both virtual nodes. Once the connectivity is restored, the depth information can be fused to the updated TSDF 485 (such as described with respect to operation 230 of FIG. 2).

In order to guide the estimation of deformation field for the next coming frame, a surface mesh is extracted from the TSDF volume in the canonical space. Since the TSDF volumetric grid could become non-manifold, the marching cubes method is modified to make it adapted to the topology changes. This modified marching cubes method is referred to as an extended marching cubes method. The basic marching cubes method involves dividing a space within a bounds into an arbitrary number of cubes, testing the corners of each cube for whether that corner is "inside" an object or "outside" an object, assigning for each cube where some corners are inside and some corners are outside the polygons needed to represent the part of the object that passes through the cube, and fusing the polygons into the desired surface.

In this classic fusion framework, each TSDF volume cell is unique. Given the position of the left-front-bottom voxel in the canonical frame, the only corresponding EDG/TSDF grid cell is returned in O(1) time. However, because of cell duplication in the methods described herein, this rule from the classic framework does not hold. Therefore, in the extended marching cubes method, for each voxel, cell information is also stored. For each EDG node, only the identifier of its belonged EDG cell is stored. For the TSDF volume, to avoid maintaining another list of all volume cells, the list of one or more voxel identifiers associated with an EDG cell are directly stored for one specific volume cell—the cell having this voxel as its left-front-bottom voxel. There are two benefits brought by adding this extra information: (1) it will help identifying the corresponding TSDF volume cell for every voxel once cells are duplicated; (2) after extracting the surface mesh by marching cubes method, each vertex also inherits the id of its belonged EDG cell, which makes it convenient to warp the mesh according to the deformation field defined by the EDG. Finally, a triangle mesh is extracted for each TSDF volumetric cell in parallel and the vertices on shared edges are merged between cells.

Accordingly, referring to FIG. 4D, a method 490 of preparing for a next frame can include performing (492) a modified marching cubes on an updated canonical TSDF 488, which is the updated TSDF 485 after the depth image is fused as described with respect to operation 230 of FIG. 2. The updated canonical TSDF includes the EDG identifier mappings as described above. Once the modified marching cubes has been performed, a triangle mesh is extracted and vertices of shared edges are merged (494) to output surface mesh 495.

As the 3D model grows by fusion of new geometry, the support of deformation field—EDG is also expanded. Because there is a predefined grid structure for EDG and the primitive element of the EDG connectivity update algorithm is an EDG cell, different from other fusion-based methods, those EDG cells, which embed the newly added geometry part to maintain the ability to separate and duplicate cells when there are new topology changes, are directly activated (see e.g., FIG. 6).

Figure 5A:
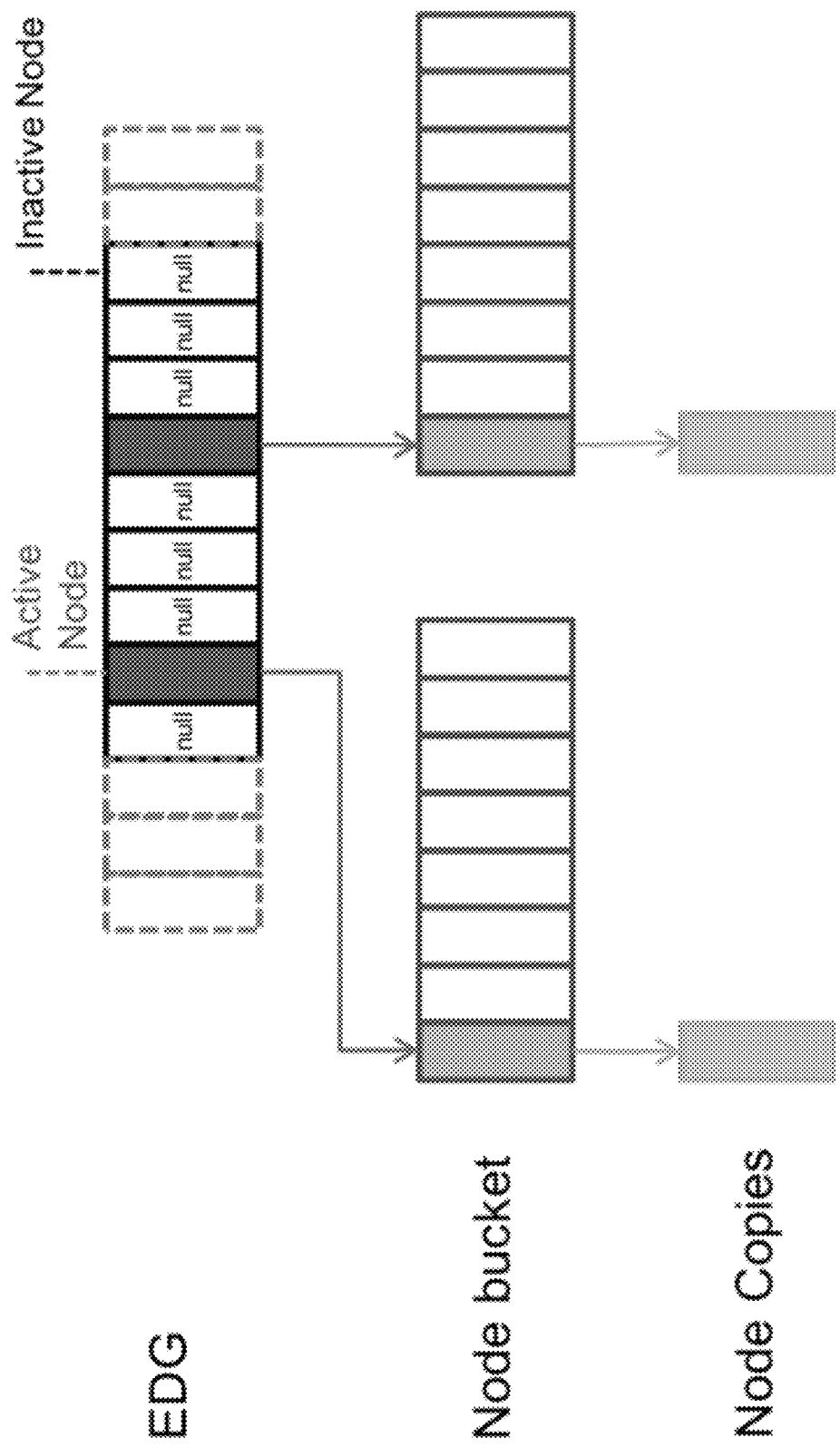
FIGS. 5A-5E illustrate an example representation of an EDG data structure and the described cutting edge detection, duplication, and restoration of connectivity.
Figure 5B:
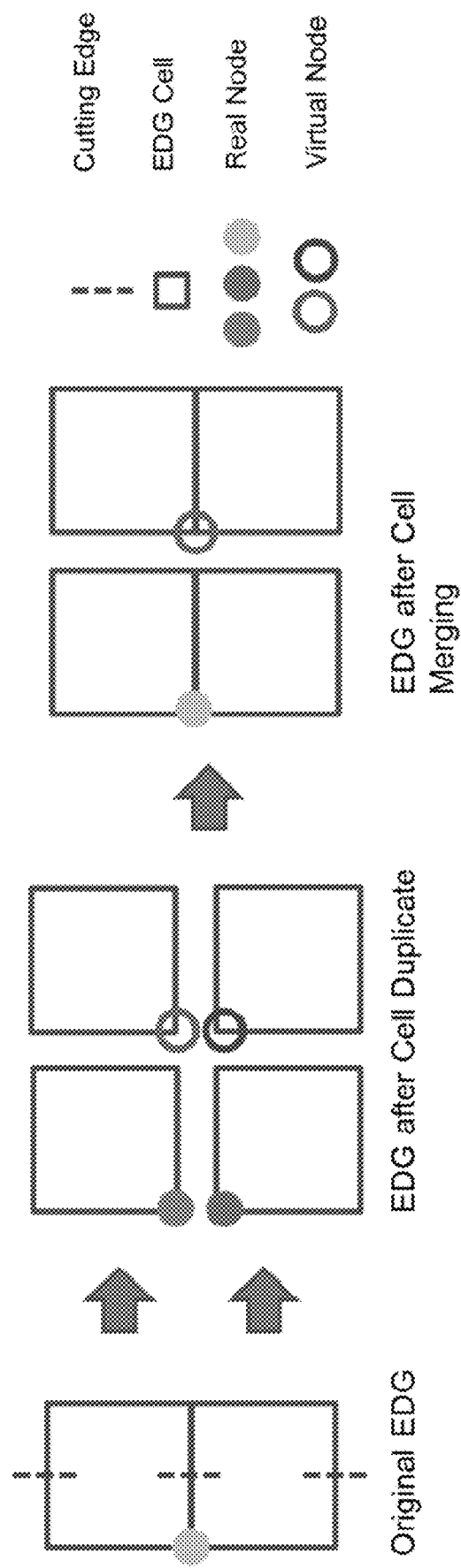
Figure 5C:
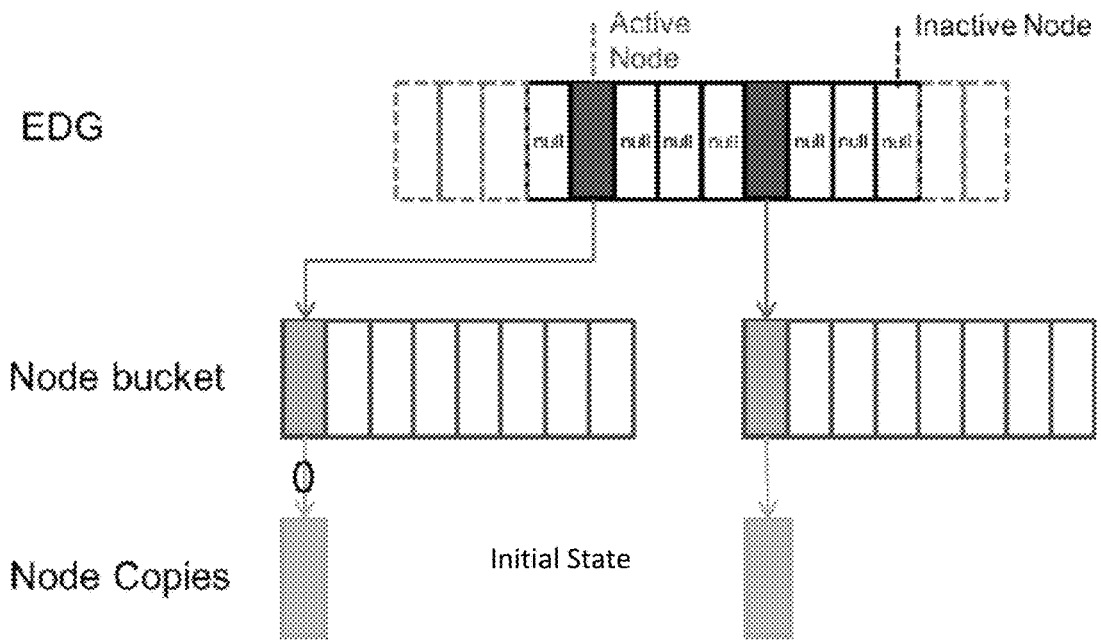
Figure 5D:
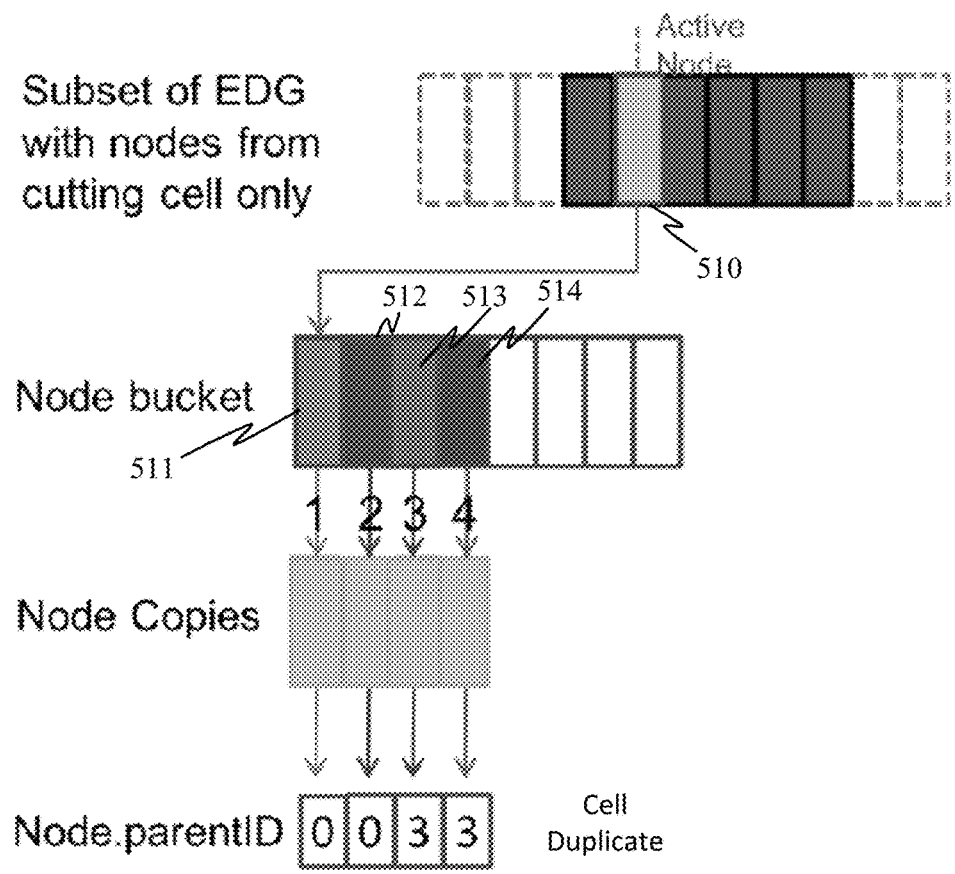
Figure 5E:
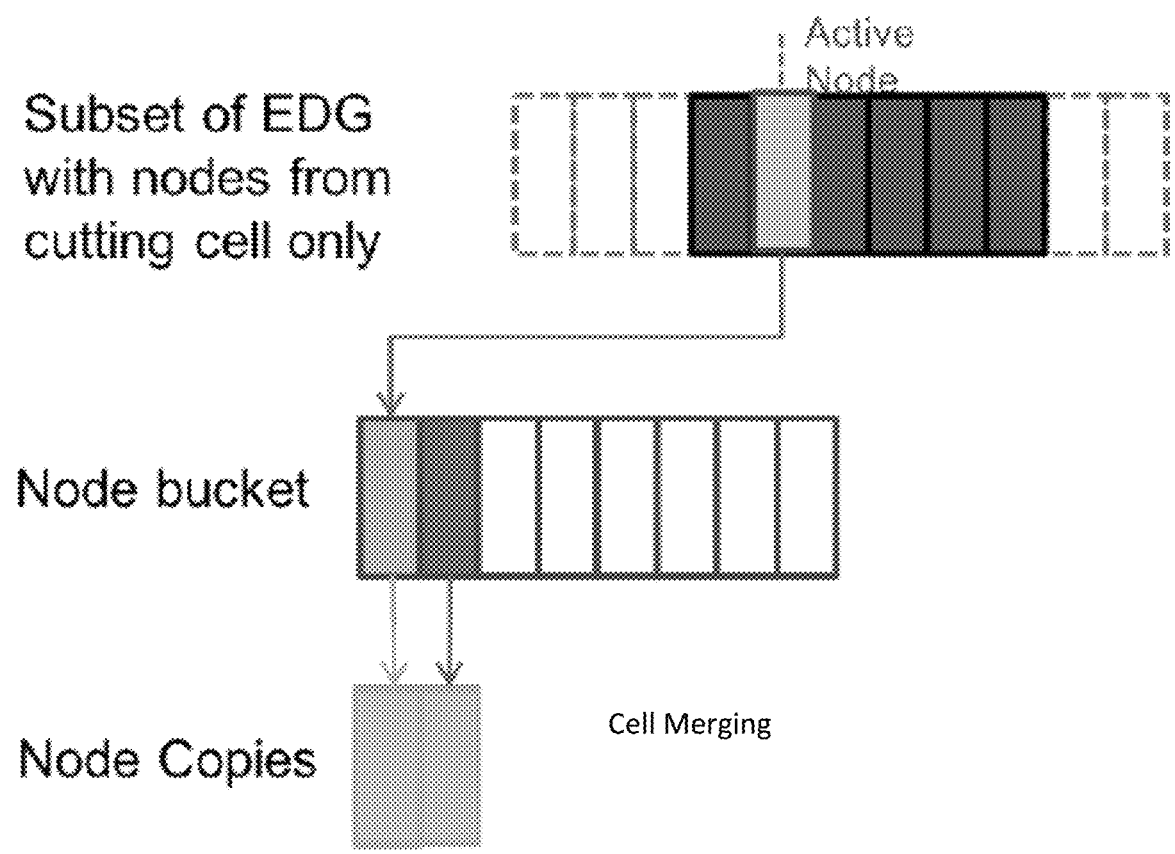

FIGS. 5A-5E illustrate an example representation of an EDG data structure and the described cutting edge detection, duplication, and restoration of connectivity. FIG. 5A illustrates a new EDG data structure for topological changes; FIG. 5B illustrates steps to duplicate EDG cells and merge them; and FIGS. 5C-5E illustrate the steps to duplicate the EDG cells and merge them as reflected by the new EDG data structure of FIG. 5A.

Real-time performance requires efficient cell duplication and merge operations and fast EDG/volume cell to node/voxel mapping and reverse mapping when duplicate cell exists. Fast vertex/voxel to EDG cell mapping and EDG cell to node mapping enables computation of the deformation of each vertex/voxel by trilinear interpolation based on the estimated deformation field. Fast volume cell to voxel mapping enables the performing of marching cubes to extract a surface mesh.

Embedded Deformation Graph (EDG) Data Structure

To support efficient cell duplicate and merge operation as well as a fast EDG/volume cell to node/voxel mapping and reverse mapping when a duplicate cell exists, for EDG, a node bucket structure is added as an intermediate level shown in FIG. 5A. This node bucket has a fixed size which is the max number of node copies allowed in the system. All EDG node buckets are stored in a flat vector. Given a 1D index i of EDG node, if the pointer to a node bucket in this indexed entry is null, it means this node is inactive. If the pointer is not null, it means at least one copy of this node is active. The index of a node copy could be computed as 8*i+offset. The following is c++ code for the new data structure:

| Listing 1.1. C++ code using listings |
|---|
| 1  Struct Node { |
| 2  //local translation |
| 3  Vector3f translate; |
| 4  //local rotation |
| 5  Matrix3f rotate; |
| 6  Node* neighbors; |
| 7  //index1d: 1D index of the node; |
| 8  //bucket_offset: offset of in NodeBucket |
| 9  Int2 index {index1d, bucket offset} |
| 10  //offsets of 8 nodes sharing the same |
| 11  //cell with this node as the |
| 12  //left-front-bottom one |
| 13  array<int,8>cell_offsets; |
| 14  //Real or virtual node |
| 15  bool realOrVirtual; |
| 16  bool activeOrNot; |
| 17  //sequential id in the graph |
| 18  //only used for duplicate and merge |
| 19  int parentID |
| 20  }; |
| 21  Struct NodeBucket { |
| 22  Node* nodeCopies[8]; |
| 23  }; |
| 24  vector<NodeBucket *> DeformGraph; |

In this way, each cell just needs to maintain the left-front-bottom node, by visiting "cell offsets" and mathematically computing the "index1d" of all 8 nodes based on regular grid, we could get the mapping from the cell to all its contained nodes. The combination of "index1d" and "cell offset" indicates the location of a node in the data structure.

After initialization, when there is no duplicate cell, each NodeBucket only contains one node copy when this node is active.

Referring to FIGS. 5B-5E, several strategies are used to improve the performance of the steps to duplicate and merge EDG cells. First, with reference to FIGS. 5B-5D, only cells containing cutting edges are considered, which is a small portion of the entire set of active EDG nodes. In this step, a new vector of NodeBucket will be created, which only contains nodes from cutting cells. Secondly, in the cell duplicate step shown in FIG. 5D, node copies are created according to the number of connected components in each cutting node cell in EDG. Referring to FIG. 5D, the node 510 is duplicated into 4 nodes: one real node (511) and one virtual node (513) from the top cell; one real node (512) and one virtual node (514) from the bottom cell. It should be noted that although the order is shown in the node bucket as being two real and then two virtual, it is possible that the order stored in the node bucket is first the two nodes of the top cell and then the two nodes of the bottom cell. The parentIDs of the nodes will be recorded, which are the offsets of the nodes that they inherit from. In the case shown in FIGS. 5C and 5D, because there is already one node copy existing in the original EDG NodeBucket vector, the offset of new node copies start from 1. The top cell real node 511 and the bottom cell real node 512 are all real nodes and inherit from node 0, so their parentID is 0. The top cell virtual node 513 and the bottom cell virtual node 514 are all virtual nodes and inherit from node 0, but they will not be merged to the parent node 0, so their parentID is 3, which is the offset of the virtual node 513. Thirdly, in the cell merging step, just UnionFind is used to merge all node copies of each NodeBucket individually based on their parentIDs, as shown in FIG. 5E "Cell Merging").

TSDF Volume Data Structure

A similar approach is used to represent the new TSDF volume data structure. The following is the c++ code for the TSDF data structure:

| Listing 1.2. C++ code using listings |
|---|
| 1  Struct Voxel { |
| 2  float depth |
| 3  float weight |
| 4  Vector3i RGB; //if needed |
| 5  Vector3f warped_pos; |
| 6  Int4 index {voxel index1d, voxel bucket offset, |
| 7  node index1d, node bucket offset}; |
| 8  array<int, 8> voxel_offsets; |
| 9  bool realOrVirtual; |
| 10  //sequential id in the graph |
| 11  //only used for duplicate and merge |
| 12  int parentID |
| 13  }; |
| 14  Struct VoxelBucket { |
| 15  Voxel* voxelCopies[8]; |
| 16  }; |

When performing cell duplication and merging, the belonged EDG cell of each voxel can be recorded. When performing marching cubes based mesh extraction, fast vertex/voxel to EDG cell mapping can be passed from voxel to vertex by recording the id of the left-front-bottom node in the belonged EDG cell in "Voxel.index.node index1d" and "Voxel.index.node bucket offset". Fast volume cell to voxel mapping is maintained in a similar way as the EDG cell to node mapping by using the property "Voxel.voxel offsets".

Figure 6:
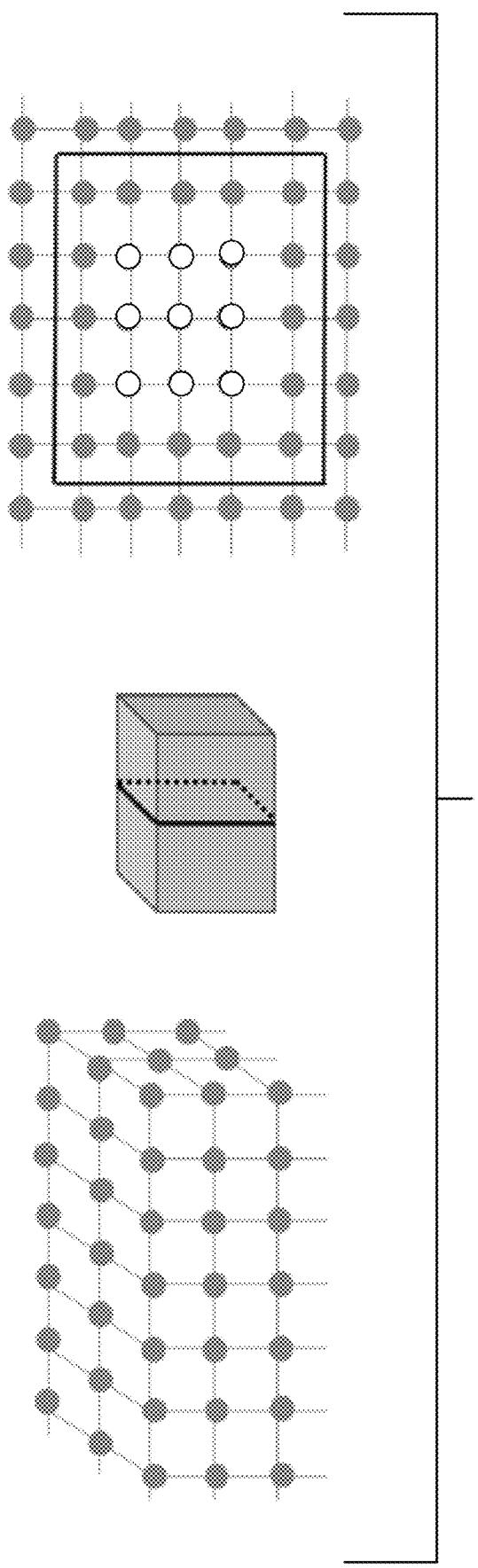
FIG. 6 shows an illustration of defining the EDG nodes on a volumetric grid structure.

FIG. 6 shows an illustration of defining the EDG nodes on a volumetric grid structure. As mentioned above, only the nodes of those cells that contain the surface geometry will be marked as active nodes and used for EDG. Given a 3D volume as shown in the center of the figure, the perspective view of the grid to the left of the 3D volume shows the EDG grid nodes of the active surface. The cross-section of the 3D volume is shown at the right, with inactive nodes in white. By continuously fusing geometry onto the volume, some of those inactive nodes might become active later. When the grid resolution of the EDG is identical as one of TSDF, the grid updating strategy becomes easier because the topology of these two grids can be maintained in the same way. A multi-resolution strategy is also provided (FIG. 4C and FIG. 8) to have the EDG at a coarser resolution than TSDF in order to reduce the real-time computation load of solving for the deformations of EDG (with fewer numbers of DOF to solve for the GPU-based Gauss-Newton solver).

Figure 7:
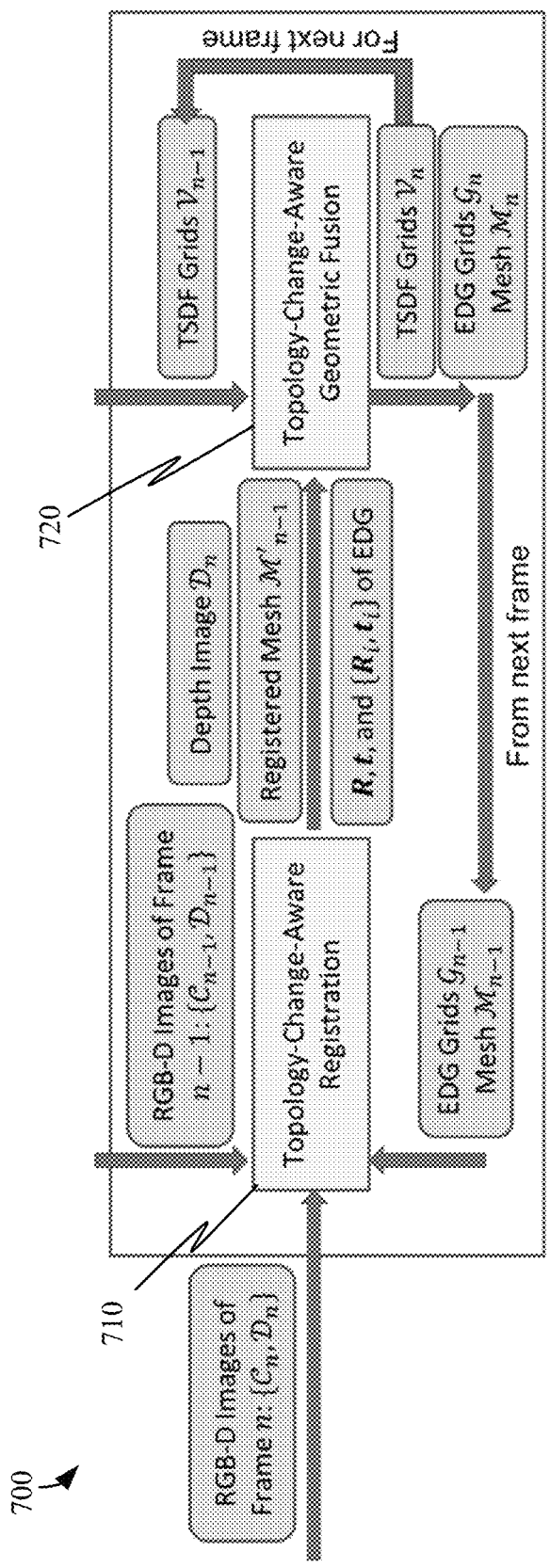
FIG. 7 illustrates an example implementation of a system and process flow for real-time dynamic 4D reconstruction with topology-change-aware volumetric fusion.

FIG. 7 illustrates an example implementation of a system and process flow for real-time dynamic 4D reconstruction with topology-change-aware volumetric fusion. Referring to FIG. 7, system 700 takes RGB-D images $\{C_n, \mathcal{D}_n\}$ of the $n^{th}$ frame, and outputs a reconstructed surface mesh $\overline{\mathcal{M}_n}$ in the canonical space and a per-frame deformation field ($\mathcal{G}_n$) that transforms that surface into the live frame. The topology changes will be reflected by updating the connectivity of the EDG and TSDF volume in the canonical space. As mentioned above, since the connectivity of the EDG and TSDF volumes are permitted to have non-manifold connectivity and are updated each frame, although the topology of $\{\overline{\mathcal{M}_1}, \ldots, \overline{\mathcal{M}_n}\}$ might evolve over time, it is possible to still replicate the topology of the ending frame $\overline{\mathcal{M}_n}$ to all of the earlier frames. Thus, it is possible to perform a playback of motions on top of reconstructed meshes with new topology. As described with respect to system 160 of FIG. 1B, system 700 FIG. 7 includes two modules: Topology-Change-Aware Registration 710, and Topology-Change-Aware Geometric Fusion 720.

For the Topology-Change-Aware Registration module 710, the deformation field is represented through an EDG, of which each node $g^{\mathcal{G}}$ provides a 3DOF displacement $t_i$ for deformation. For each point (surface vertex or voxel) $x_c$ in canonical space, $T(x_c) = R\Sigma_i \alpha_i (x_c + t_i) + t$ transforms this point from canonical space into the live frame via trilinear interpolation, where i is the node index of $x_c$-belonged EDG cell and $\alpha_i$ is the interpolation weight. When a new $n^{th}$ frame comes in, the global rotation R, global translation t, and local displacement $t_i$ are updated on the nodes, based on the reconstructed mesh $\mathcal{M}_{n-1}$ from previous frame. The topology-change-aware registration module 710 can perform processes 400 and 450 as described with respect to FIGS. 4A and 4B.

When estimating the deformation field, the registration can be decomposed into two steps: rigid alignment, and non-rigid, deformable, alignment. The rigid alignment is to estimate the global rotation R and global translation t and can be performed by using dense projective ICP (see Rusinkiewicz, S., Levoy, M.: Efficient variants of the icp algorithm. In: 3dim. vol. 1, pp. 145-152 (2001)). During the non-rigid "deformable" alignment, the current local deformation field $\{R_i, t_i\}$ given the previous reconstructed mesh $\mathcal{M}_{n-1}$ and the RGB-D images $\{C_n, \mathcal{D}_n\}$ of this frame are estimated by minimizing an energy function, including a registration objective function. The energy function is designed as a combination of three terms: $E_{total}(X) = \omega_s E_{sparse}(X) + \omega_d E_{dense}(X) + \omega_r E_{reg}(X)$.

Here, $E_{sparse}$ is a sparce feature-based alignment objective given as $E_{sparse}(X) = \Sigma_{f \in \mathcal{F}} \|(T(f)-y)\|^2$, $E_{dense}$ is a dense depth-based measure given as $E_{dense}(X) = \Sigma_{x \in \mathcal{M}_{n-1}} [n_y^T(T(x)-y)]^2$, and $E_{reg}$ is a regularization term. The weights $\omega_s$, $\omega_d$, and $\omega_r$ control the relative influence of the different energy terms. In the sparce feature objective and dense feature objective, y is the corresponding point (in the target) of a feature point or mesh vertex and $n_y$ is the estimated normal of each corresponding point.

For the sparce feature objective, the corresponding SIFT features $\mathcal{F}$ are extracted between the RGB-D images of current and previous frame as the sparse feature points similar to VolumeDeform [Innmann et al. 2016].

The dense objective enforces the alignment of the surface mesh $\mathcal{M}_{n-1}$ with the captured depth data based on a point-to-plane distance metric. The regularization term is an as-rigid-as-possible (ARAP) prior by enforcing the one-ring neighborhood of a node to have similar transformations. However, such ARAP prior is not able to detect potential topology changes, i.e., the breaking of connection between neighboring nodes.

To account for the discontinuity caused by topology changes, a line process is introduced by the regularization term. The regularization term can be given as:

$E_{reg} = \Sigma_i \Sigma_{j \in N(i)} [l_{ij} \|R_i(g_i - g_j) - (\tilde{g}_i - \tilde{g}_j)\|^2 + \Psi(l_{ij})]$, where $\tilde{g}_i = g_i + t_i$ and $g_i$ and $g_j$ are the position of the two nodes on EDG grid $\mathcal{G}_{n-1}$ from the previous frame. The function $\Psi(l_{ij}) = \mu(\sqrt{l_{ij}} - 1)^2$, which is a "penalty" of introducing a discontinuity between two nodes i and j, $l_{ij}$ is a line process parameter indicating the presence or absence of a discontinuity between neighboring nodes i and j, and $\mu$ is a weight controlling the balance of the ARAP that measures the similarity of transformations between neighboring nodes and the penalty function. Indeed, the first term in $E_{reg}$ is exactly the ARAP prior measuring the similarity of transformations between neighboring nodes, except for the multiplication of the line process parameter $l_{ij}$.

As mentioned above, in the non-linear optimization problem, rotation angles, displacements, and line processes are the variables being solved. After the optimization, the edges identified in the previous frame as having a discontinuity between neighboring nodes can be flagged as "to-be-cut" in the current frame (e.g., the new warped surface mesh can be used as the initial surface to estimate the deformation field for the next frame.

In some cases, the optimization solving for the rotation matrices, displacements, and line process is an alternating optimization. This is described below.

Alternating optimization: solve three groups of unknowns by fixing the other two groups and solve one group.

Step 1 [Fix $\{R_i^T\}$ and $\{l_{ij}\}$ solve $\{t_i\}$] Set $$\frac{\partial E_{total}(t_i)}{\partial t_i} = 0$$

Solve $A^T W A x = -A^T W b$ with Preconditioned Conjugate Gradient (PCG), where x is the stacked vector of all $t_i$ and W is the diagonal matrix of term weights.

$$A = \begin{pmatrix} & \vdots & & & \\ \ldots & \alpha_i(R^T n_y)^T & \ldots & \alpha_j(R^T n_y)^T & \ldots \\ & \vdots & & & \\ \ldots & \alpha_i R & \ldots & \alpha_j R & \ldots \\ & \vdots & & & \\ \ldots & l_{ij} I & \ldots & -l_{ij} I & \ldots \\ & \vdots & & & \end{pmatrix}$$

$$b = \begin{pmatrix} \vdots \\ n_y^T(T(x) - y) \\ \vdots \\ T(f) - y \\ \vdots \\ l_{ij}(R_i - I)(g_i - g_j) \\ \vdots \end{pmatrix}$$

Step 2 [Fix $\{t_i\}$ and $\{l_{ij}\}$, solve $\{R_i^T\}$] For each $R_i^T$, it is a least square rigid estimation, which has a closed form solution. Therefore, all $\{R_i^T\}$ could be solved in parallel.

First, compute the cross-covariance matrix A for all $g_i$ corresponding terms:

$$A = XLY^T$$

$$X = \begin{pmatrix} \cdots \\ g_i - g_j \\ \cdots \end{pmatrix}$$

$$L = \begin{pmatrix} \ddots & & \\ & l_{ij} & \\ & & \ddots \end{pmatrix}$$

$$Y = \begin{pmatrix} \cdots \\ [g_i + t_i - (g_j + t_j)]^T \\ \cdots \end{pmatrix}$$

Secondly, by solving the Singular Value Decomposition (SVD) of matrix A, the optimal value of $\Delta R_i^{**}$ is:

$$\Delta R_i^* = V \begin{pmatrix} 1 & & \\ & 1 & \\ & & det(VU^T) \end{pmatrix} U^T$$

where $A = U\Sigma V^T$.

Step 3 [Fix $\{R_i^T\}$ and $\{t_i\}$, solve $\{l_{ij}\}$] by setting $$\frac{\partial E_{reg}(l_{ij})}{\partial l_{ij}} = 0$$

Solve $$l_{ij} = \left( \frac{\mu}{\mu + \|R_i(g_i - g_j) - [g_i + t_i - (g_j + t_j)]\|^2} \right)^2$$

Initialization: $R_i^T \leftarrow I$, $t_i \leftarrow t'_i$ (optimal $t_i$ solved from previous frame, $l_{ij} \leftarrow 1.0$.

In some cases, when detecting topology change events, an extra backward registration can be performed from the registered mesh to the source RGB-D image based on previous registration result, and find all cutting edges of EDG cells according to line process weights from both forward and backward registration. There are several reasons to add this backward registration. (1) Re-using the EDG instead of resampling a new EDG from the registered mesh will preserve the correct graph node connectivity (edges along the separating boundaries having longer length due to stretching) when there is an open-to-close topology change event while the resampled EDG would not have that correct one. (2) It will help reducing the number of "false positive" cases when only considering the forward registration. "False positive" cases are usually caused by finding bad correspondences with outliers. This can be solved by using bidirectional correspondence search and adding backward registration follows the same way. (3) This backward registration is still computationally light-weight without the need to re-generate a new EDG and all computed line process weights can be directly used to guide the topology change event detection.

As mentioned above, the formula to compute $l_{ij}$ is:

$$l_{ij} = \left( \frac{\mu}{\mu + \|R_i(g_i - g_j) - [g_i + t_i - (g_j + t_j)]\|^2} \right)^2$$

The threshold of $l_{ij}$ is set to distinguish between highly stretched (or compressed) edges and normal edges. As an assumption, if the ratio of an edge stretched (or compressed) to the normal length is 20%, there exists a potential topology change event. Then a good approximation of $\mu$, is 20%×cell length. In practice, if $l_{ij} < 0.5$ in the forward registration step and $l_{ij} < 0.8$ in the backward registration, it will be classified as a cutting edge, and there is a new topology change event detected. The EDG connectivity can be updated as described with respect to FIG. 5B.

For the Topology-Change-Aware Geometric Fusion module 720, the TSDF volume can be updated and fused based on the deformation field estimated from the topology-change-aware registration module 710 and the depth image $\mathcal{D}_n$ in the $n^{th}$ frame.

In order to accelerate the registration running speed and improve the reconstruction quality of geometry, a strategy of multi-level grids can be employed. Here, the resolution of EDG is lower than that of TSDF volume, with a ratio of 1:(2k+1) in each dimension ($k \in \{1,2,3\}$ in the experiments).

Once the deformation field is estimated, the connectivity of the EDG is propagated to the TSDF volume and the depth image is fused as well.

Figure 8:
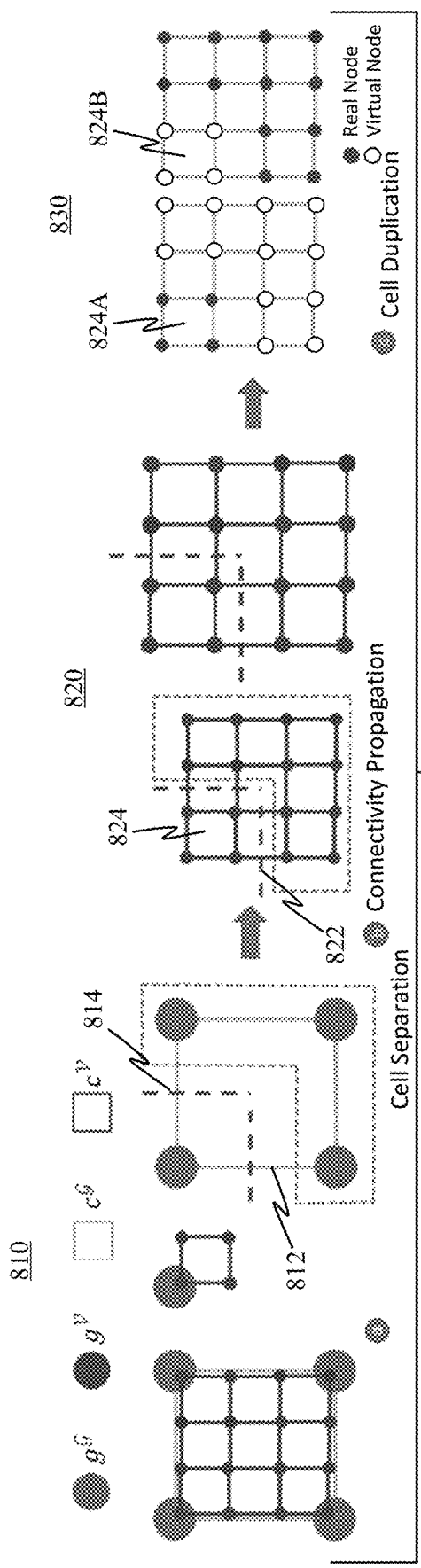
FIG. 8 shows an example representation for propagating the connectivity of EDG nodes to that of TSDF grids when TSDF is represented in higher resolution volumetric grids than EDG.

FIG. 8 shows an example representation for propagating the connectivity of EDG nodes to that of TSDF grids when TSDF is represented in higher resolution volumetric grids than EDG. As described with respect to process 470 of FIG. 4C, the input include (a) EDG cells and their embedded TSDF volume cells; and (b) a set of cutting edges in EDG.

In the current example, each EDG cell contains $(2k+1)^3$ TSDF cells and $(2k+2)^3$ TSDF voxels. Each EDG node controls $(k+1)^3$ voxels. FIG. 8, representation 810 shows a 2D case when k=1. Each volume cell $c^V$ is separated by considering the connected components (CCs) of its associated EDG cell (812 with cutting edge 814)—the CCs belonging to each voxel is the same as its associated EDG node. If two vertices of an edge belong to different CCs, this edge is treated as a cutting edge. As shown in representation 820, the cutting edge 822 is reflected in the TSDF volume.

In the second step, cell duplication based on CCs is performed. TSDF volume cells are duplicated depending on the number of CCs of an EDG cell $c^G$, as shown in representation 830. Therefore, even though the number of CCs of TSDF volume cell on the top left is 1 (shown as cell 824), it will still be duplicated as two copies: one copy containing all real nodes (824A) while the other copy containing all virtual nodes (824B).

For virtual nodes in the TSDF volumetric structure, their TSDF values are updated according to updating rules to inhibit problems that can arise. As described with respect to operation 482 of FIG. 4C, the following three updating rules can be used: (1) For all real nodes, each real node has its TSDF value inherited from the original cell, which maintains continuity of their TSDF. (2) For all virtual nodes that are connected to real nodes, if their connected real node has negative TSDF value (meaning inside the surface), the TSDF of the corresponding virtual node is set by negating that value, i.e. $-d \rightarrow +d$. (3) For all remaining virtual nodes that have not been assigned TSDF values, their values are set as +1.

Figure 9:
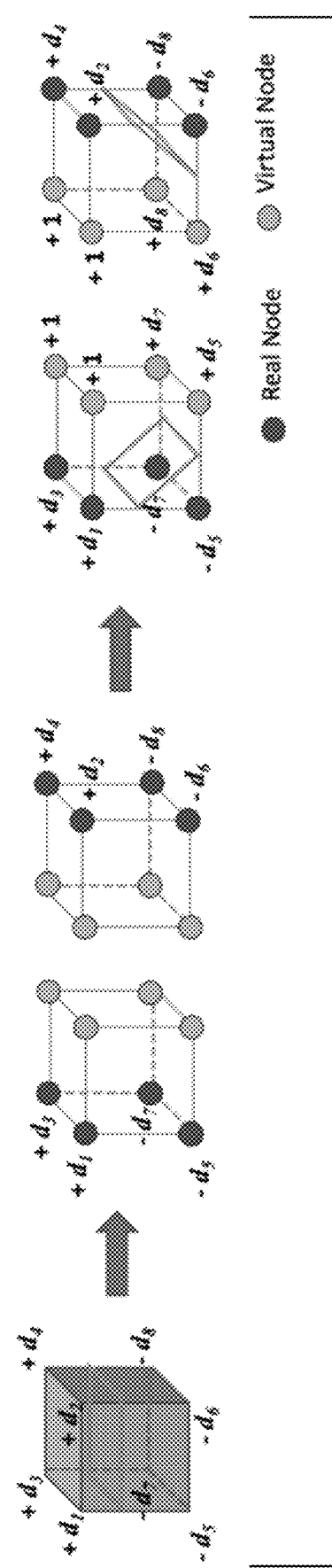
FIG. 9 shows an illustration of three updating rules of signed distance values of TSDF according to an implementation.

FIG. 9 shows an illustration of the three updating rules of the signed distance values of TSDF according to an implementation. It can be noted that these TSDF values may continue to be updated by the depth fusion step that follows the cell duplication step.

In the third step, restoring connectivity is performed. Here, for any pair of geometrically adjacent duplicate cells $c^V$ (in the canonical space), given two nodes $g^V$ from them respectively, the two nodes $g^V$ are merged if they are copied from the same original node and they are: (1) both real nodes, or (2) both virtual nodes. This is a different rule than used for an EDG cell $c^g$. Because the connectivity update of EDG is propagated to the TSDF grid, the geometry represented by TSDF can reflect topology changes and each cell $c^V$ in the volume can find its correct EDG cell association. Next, all voxels will be warped to the live frame by the estimated deformation field. Depth information can then be fused into the volume in the canonical space using any suitable method. Finally, a surface mesh is extracted to prepare for the next frame, such as described with respect to FIG. 4D.

Demonstrations and Evaluations of Topology Aware Volumetric Fusion

As a demonstration of topology change detection, method 500 implemented as described with respect to FIG. 7 was run on public datasets used in Zampogiannis, K., Fermuller, C., Aloimonos, Y.: Topology-aware non-rigid point cloud registration. IEEE Transactions on Pattern Analysis and Machine Intelligence (2019).

Figure 10:
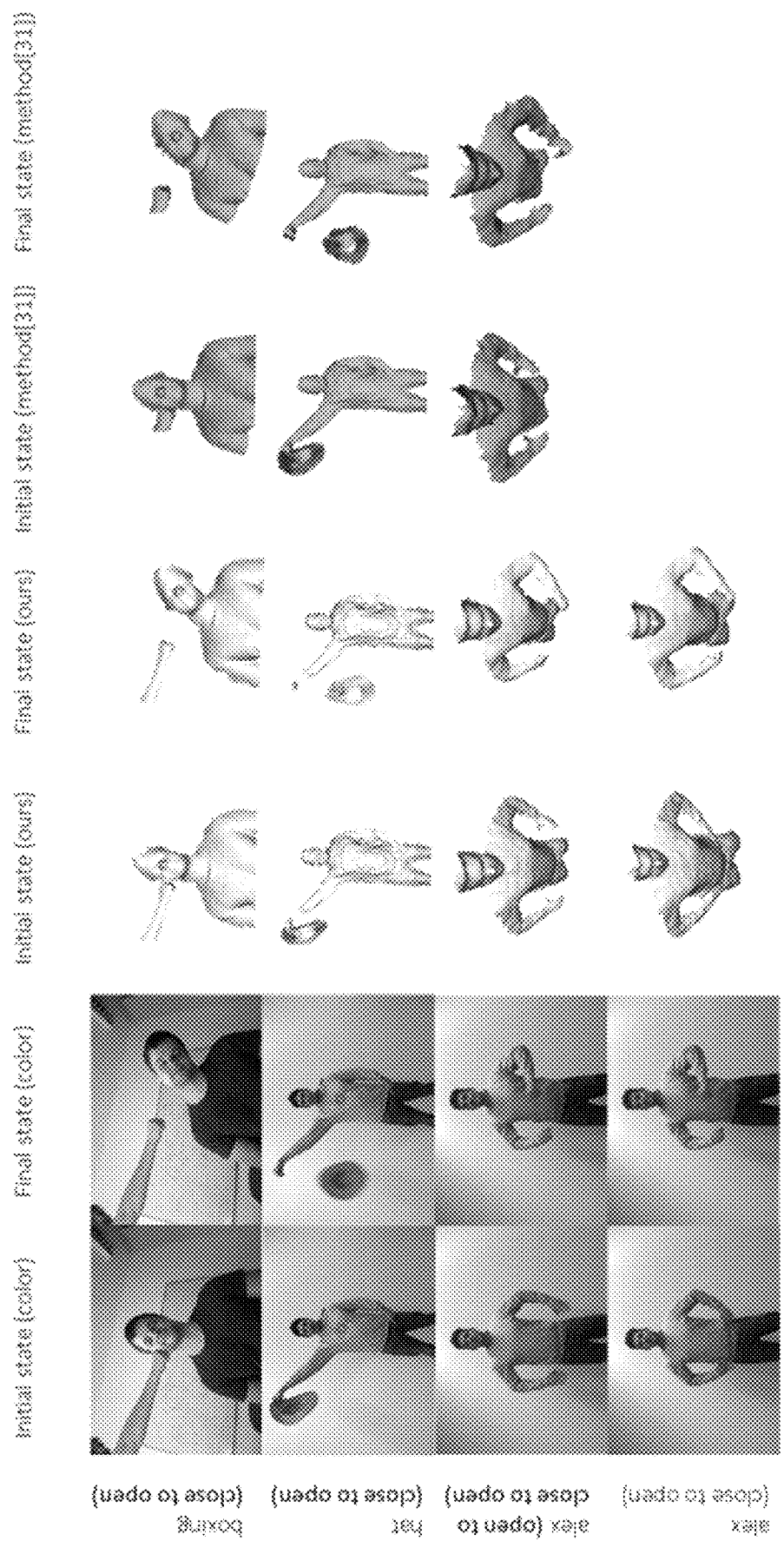
FIG. 10 shows results of a demonstration of topology change detection.

FIG. 10 shows results of a demonstration of topology change detection. Referring to FIG. 10, results of the described technique is compared to method[31] (found in Pons-Moll et al. 2010).

As can be seen by this demonstration, the described approach can also successfully detect all topology change events and update the connectivity of EDG and TSDF grids to reflect such topology changes accordingly in reconstructed geometry. It is worth noting that the described method can handle a more complex case like seq "alex (close to open)" (from KillingFusion by Slavcheva, M., Baust, M., Cremers, D., Ilic, S.: KillingFusion: Non-rigid 3d reconstruction without correspondences. In: Proceedings of the IEEE Conference on Computer Vision and Pattern Recognition. pp. 1386-1395 (2017) "Slavcheva et al. 2017")—hand moving from contacting with body to no contact.

There are several specific public datasets on topology change problems. Tsoli and Argyros provided both synthetic and real data, from which the synthetic data is generated through physics-based simulation in Blender and the real data is captured with Kinect v2. (Tsoli, A., Argyros, A. A.: Tracking deformable surfaces that undergo topological changes using an rgb-d camera. In: 2016 Fourth International Conference on 3D Vision (3DV). pp. 333-341. IEEE (2016)). Slavcheva et al. 2017 also published their data. Evaluations were conducted qualitatively and quantitatively our method based on these datasets. In addition, an ablation study was performed to illustrate the effect of certain components in the pipeline process for topology-change-aware volumetric fusion.

The baseline methods selected for synthetic data evaluation are coherent point drift (CPD) as described by Myronenko et al. 2010 (Myronenko, A., Song, X.: Point set registration: Coherent point drift. IEEE transactions on pattern analysis and machine intelligence 32(12), 2262-2275 (2010)), MFSF as described by Garg et al. 2013 (Garg, R., Roussos, A., Agapito, L.: A variational approach to video registration with subspace constraints. International journal of computer vision 104(3), 286-314 (2013)), Tsoli and Argyros's method, and VolumeDeform by Innmann et al. 2016 The first three methods are template based non-rigid registration methods. Specifically, Tsoli and Argyros's method can deal with deformable surfaces that undergo topology changes. VolumeDeform and the topology-change-aware volumetric fusion method described herein are both template-less fusion-based reconstruction methods.

Two metrics were selected for evaluation: (1) Euclidean distance from ground truth; and (2) the number of vertices off the surface. Metric 1 can quantitatively evaluate the overall reconstruction quality while metric 2 provides a deeper insight about how the topologically changed parts are reconstructed. There will be lots of vertices "off the surface" if the topologically changed part is not well considered and processed. Here, the distance measurement for both metrics are expressed as a percentage of the cell width of the underlying grid. To be consistent with Tsoli and Argyros's experiment for the methods without any predefined template, the volume is allocated according to the same grid cell width and the resolution of their template in x and y axis directions.

Figure 11A:
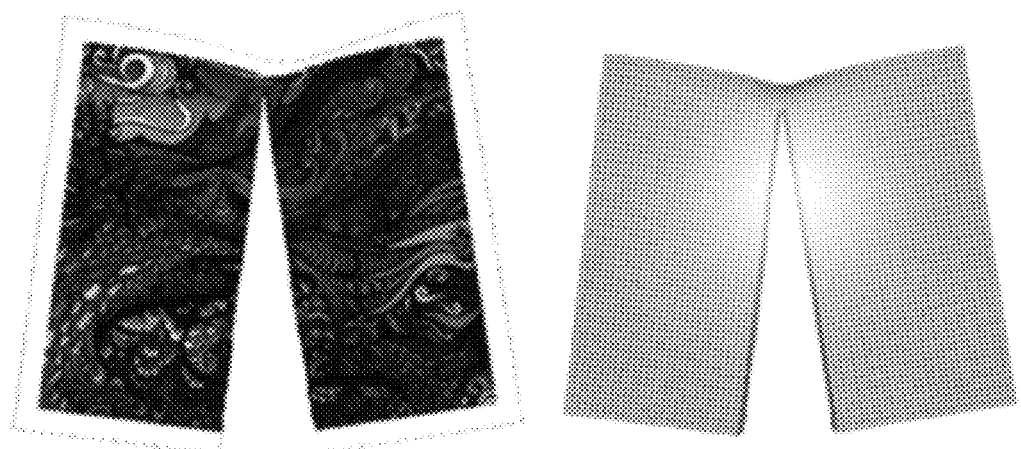
FIGS. 11A-11C show results of the reconstruction using the topology-change-aware volumetric fusion method described herein for a single cut, for multiple non-intersecting cuts, and for two intersecting cuts, respectively.
Figure 11B:
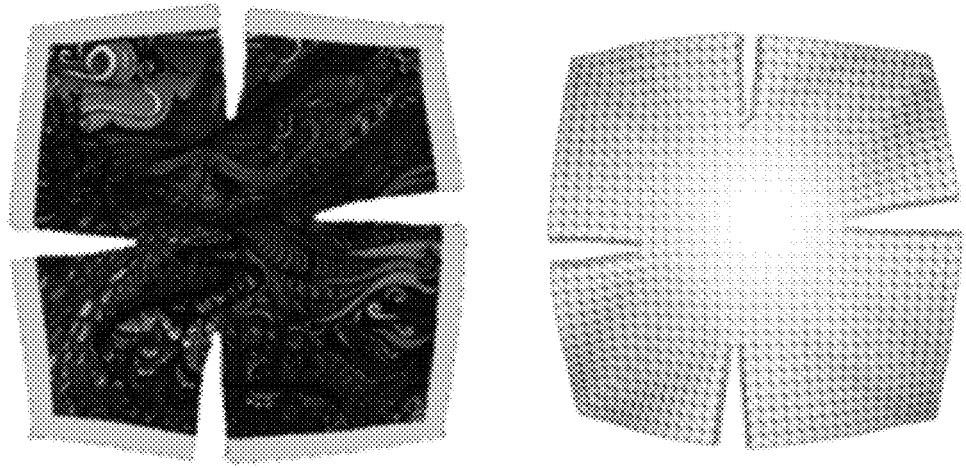
Figure 11C:
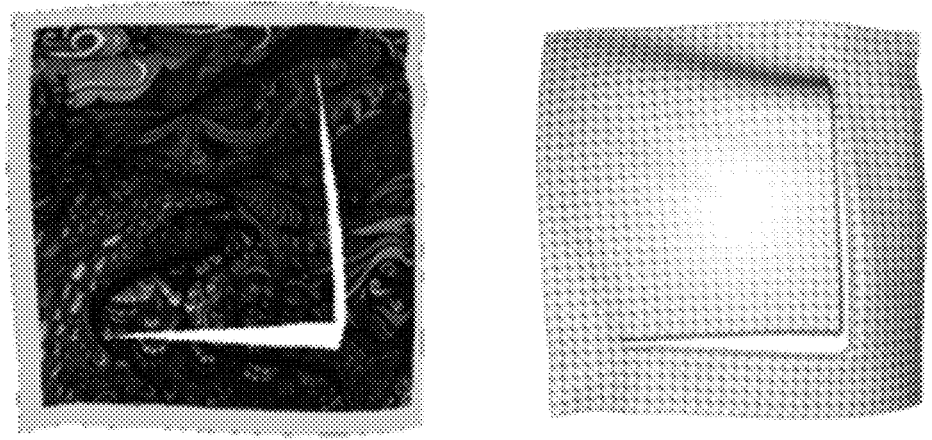

All five methods were evaluated on synthetic dataset: a single cut (seq1), multiple non-intersecting cuts (seq2), and two intersecting cuts (seq3), as shown in FIGS. 11A-11C, where FIG. 11A shows results of the reconstruction using the topology-change-aware volumetric fusion method described herein for a single cut; FIG. 11B shows results of the reconstruction using the topology-change-aware volumetric fusion method described herein for multiple non-intersecting cuts; and FIG. 11C shows results of the reconstruction using the topology-change-aware volumetric fusion method described herein for two intersecting cuts.

Figure 12:
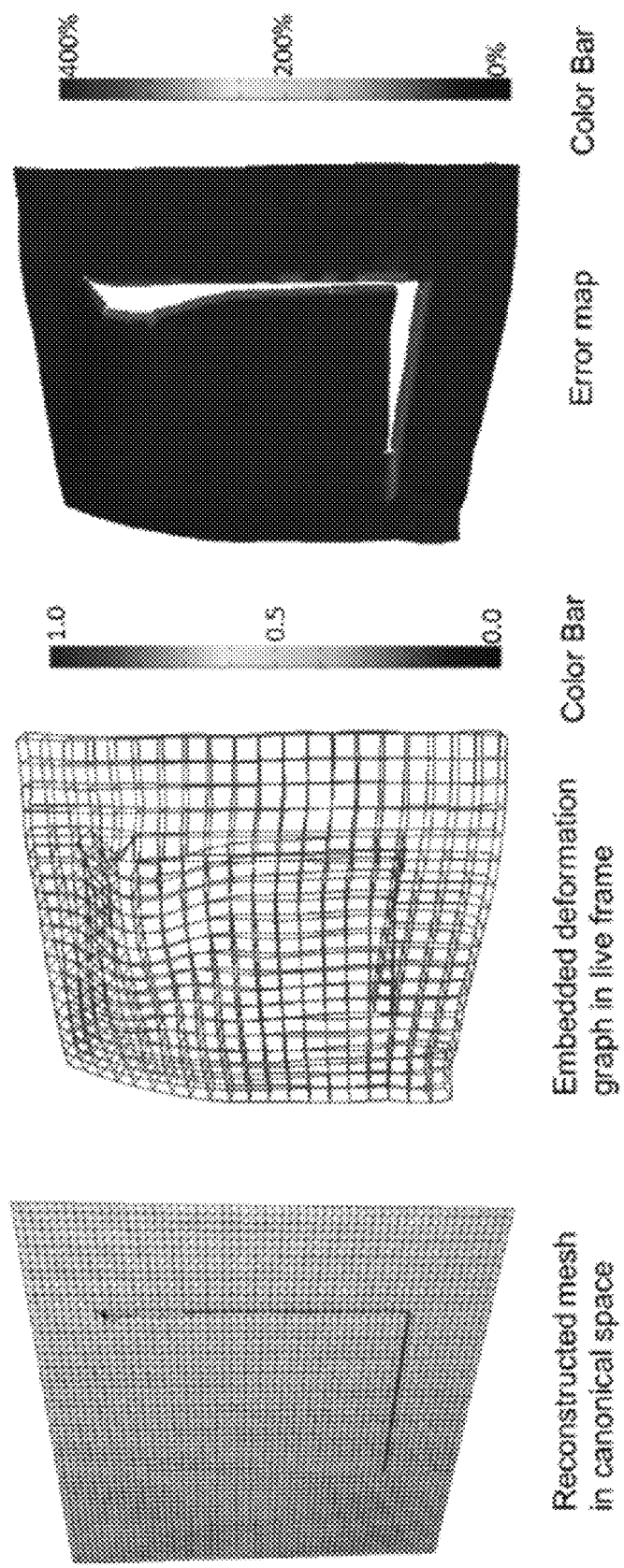
FIG. 12 shows a reconstruction result on frame #36 of seq3 in Tsoli and Argyros's dataset.

FIG. 12 shows a reconstruction result on frame #36 of seq3 in Tsoli and Argyros's dataset. The "color bar" associated with the embedded deformation graph in live frame represents line process weights $l_{ij}$ from 1 to 0. The error map shows the Euclidean distance from ground truth, expressed as the percentage of the cell width in TSDF volume. It can be seen that the reconstructed mesh in live frame reflects the topology change in this case and so does the reconstructed mesh in canonical space. The line process weights of edges also represent the presence of deformation discontinuity.

Figure 13A:
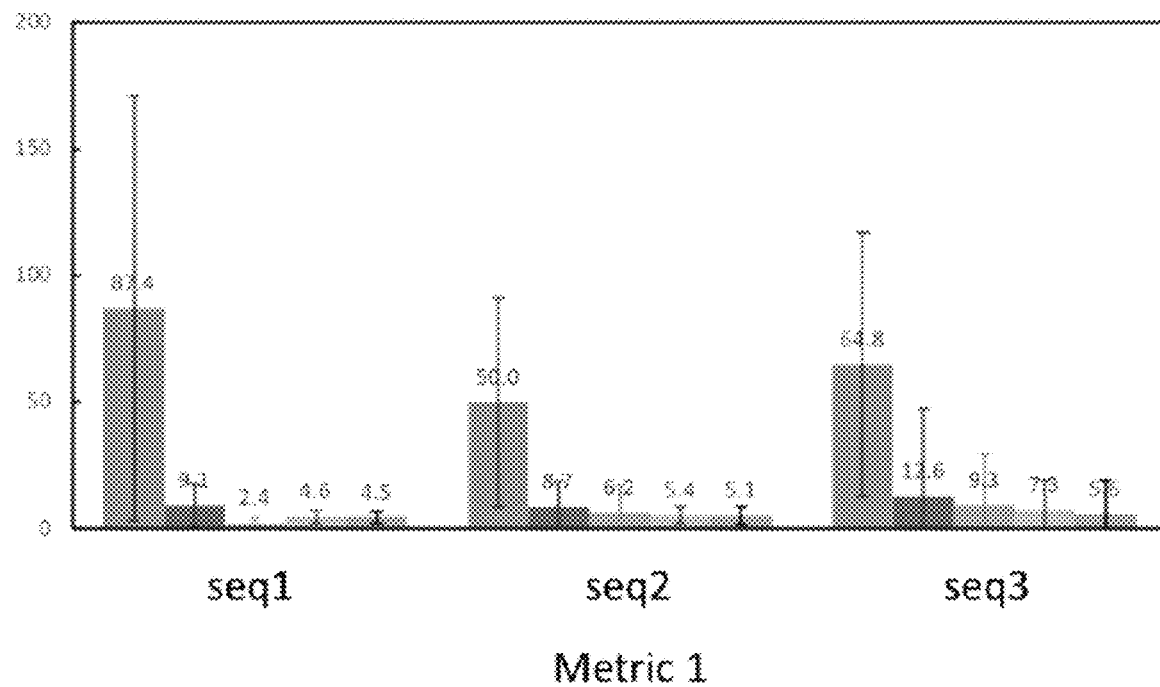
FIGS. 13A and 13B show the performance of each method based on the two error metrics.
Figure 13B:
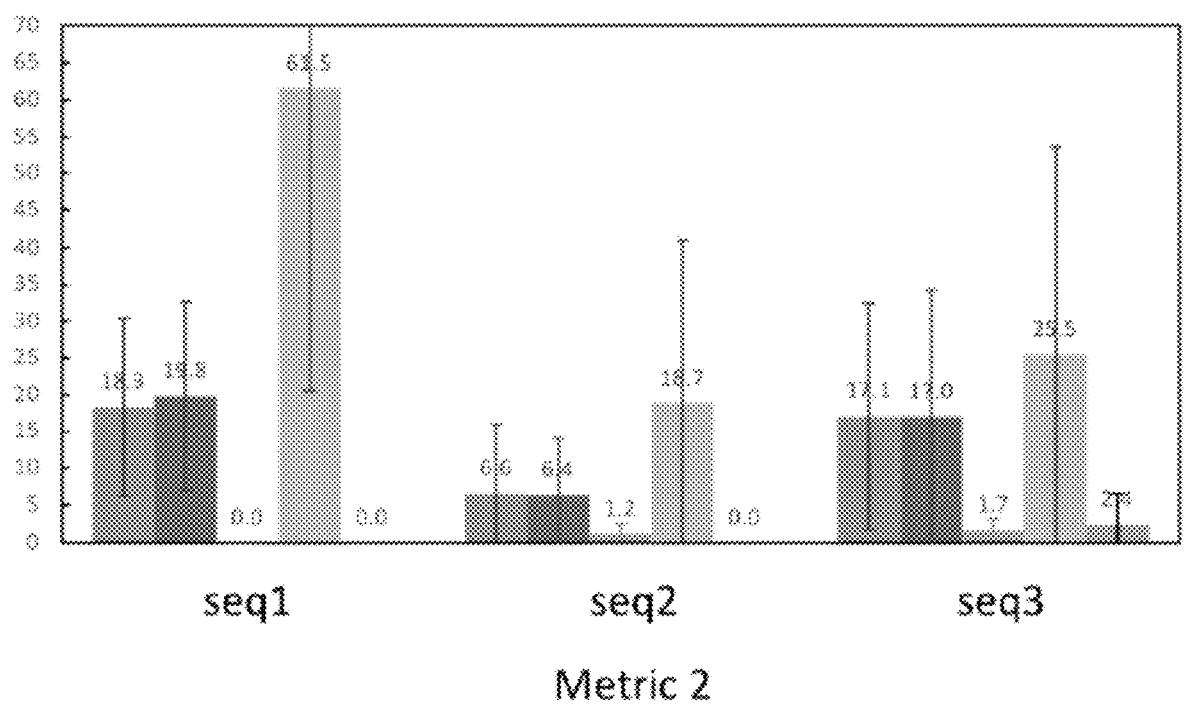

FIGS. 13A and 13B show the performance of each method based on the two error metrics. As can be seen by the plots, the topology-change-aware volumetric fusion method described herein outperforms all other methods on seq2 and seq3 in terms of the distance from ground truth. Only Tsoli and Argyros's method does a better job on seq1. Under metric 2, the topology-change-aware volumetric fusion method described herein outperforms all other methods on seq2. On seq1, the topology-change-aware volumetric fusion method described herein is better than all other methods except Tsoli and Argyros's method. On seq3, the topology-change-aware volumetric fusion method described herein has a bit higher average error than Tsoli and Argyros's method.

Figure 14:
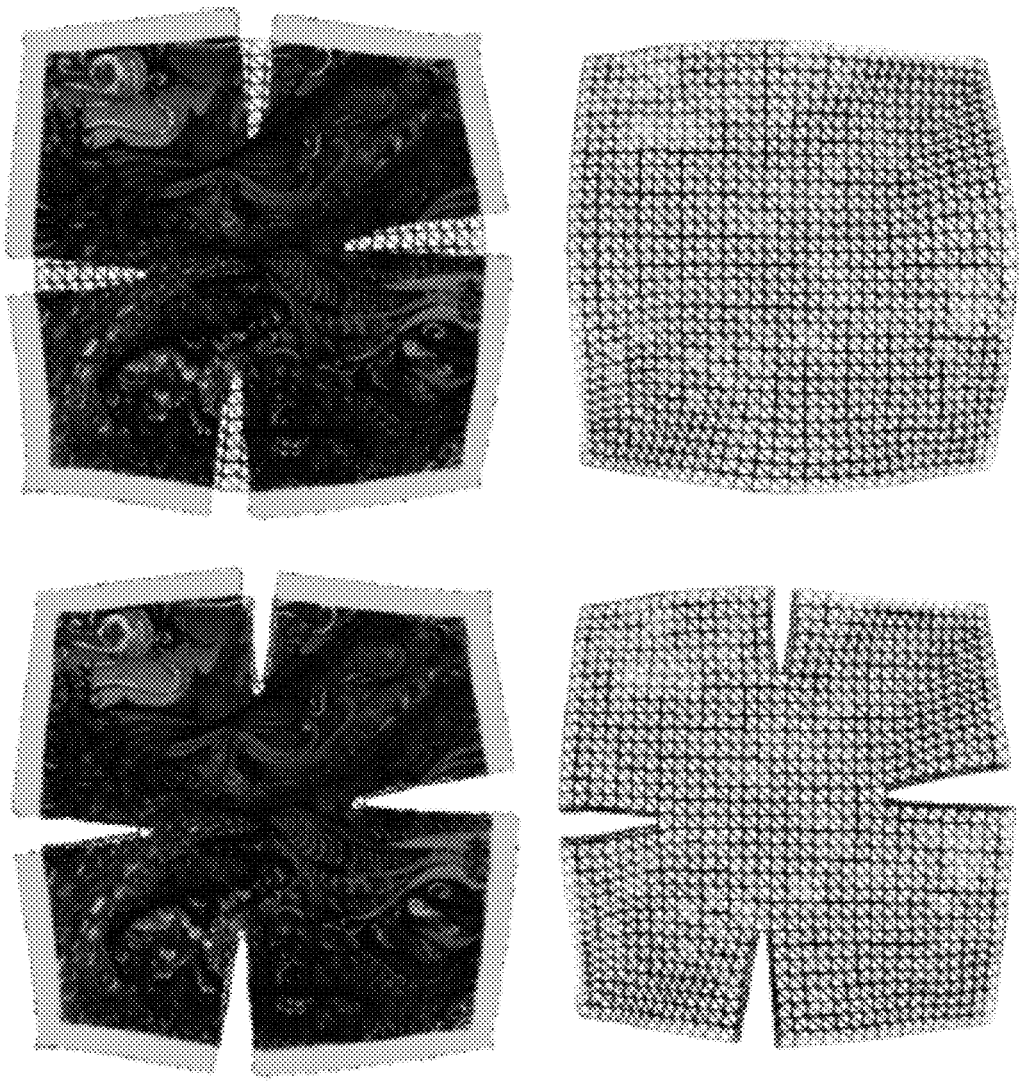
FIG. 14 shows reconstruction results on seq2 of Tsoli and Argyros's dataset by VolumeDeform (top) and the topology-change-aware volumetric fusion method described herein (bottom).

FIG. 14 shows reconstruction results on seq2 of Tsoli and Argyros's dataset by VolumeDeform (top) and the topology-change-aware volumetric fusion method described herein (bottom). FIG. 14 illustrates a reason why VolumeDeform performs well under metric 1 but much worse under metric 2. It is because VolumeDeform keeps a fixed-topology grid structure to represent the deformation field and the geometry, and has no mechanism to deal with topology changes.

Figure 15A:
FIGS. 15A and 15B show some reconstruction results on VolumeDeform datasets.
Figure 15A:
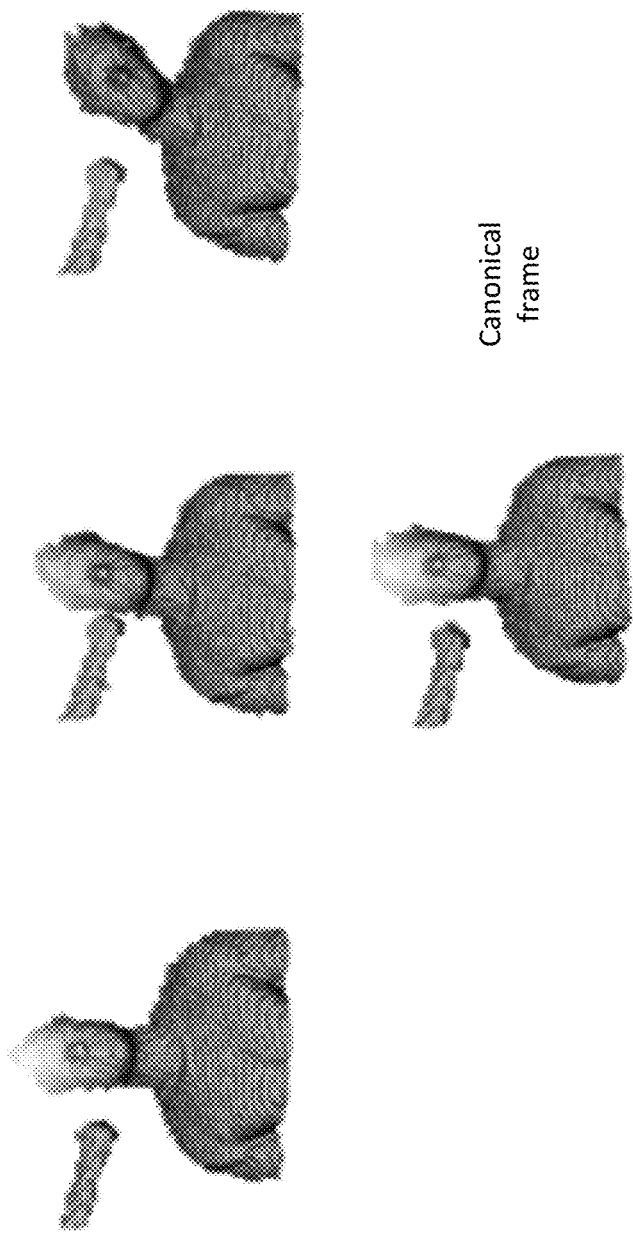
Figure 15B:
Figure 15B:
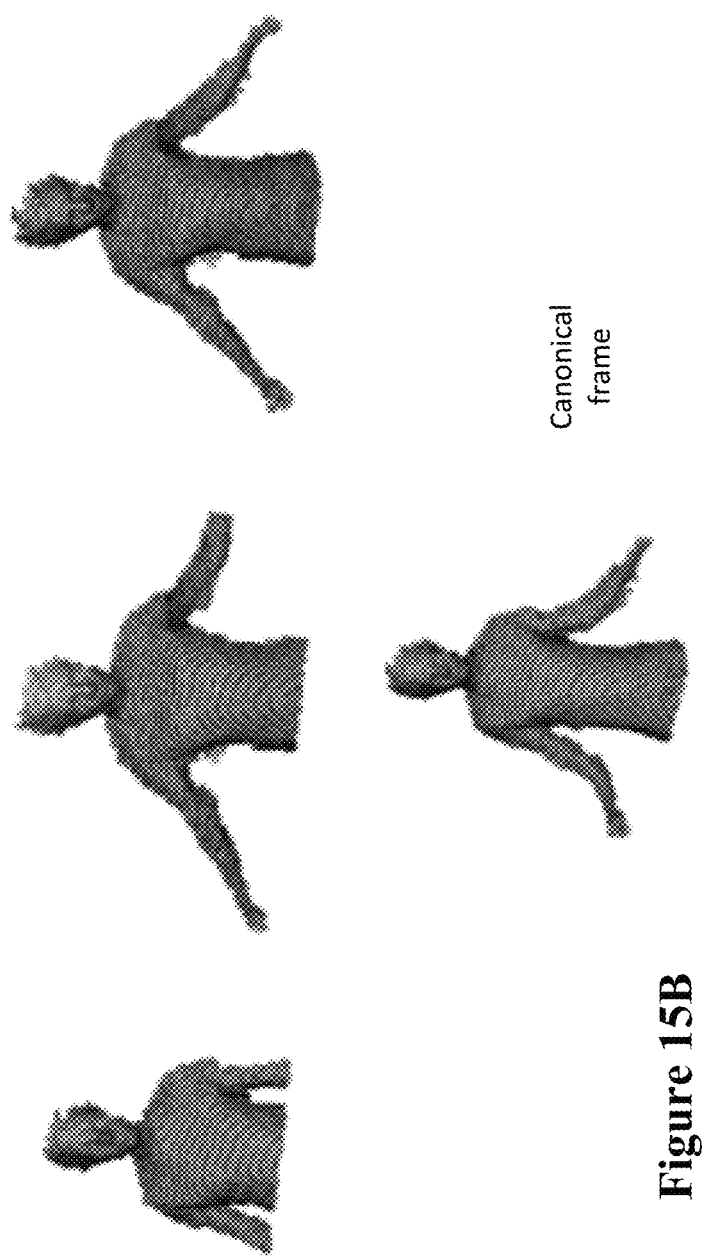

FIGS. 15A and 15B show some reconstruction results on VolumeDeform datasets. Referring to FIG. 15A, in the boxing sequence, it can be seen that the topology-change-aware volumetric fusion method described herein works well on an open-to-close-to-open motion. Referring to FIG. 15B, in the second sequence, the reconstructed geometry of upper body is rendered from a different viewpoint to make it easier to see the geometry growth during fusion.

Figure 16A:
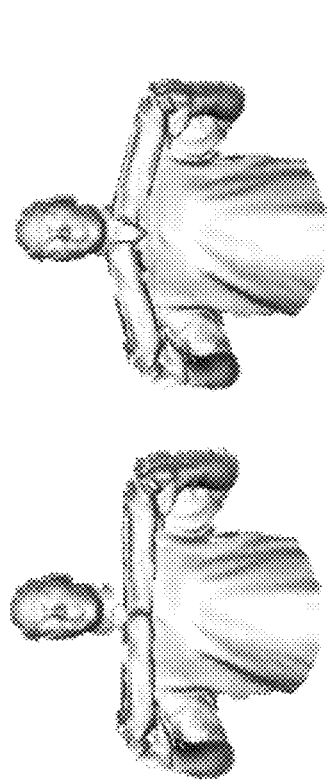
FIGS. 16A-16D show results on real data with topology changes.
Figure 16B:
Figure 16C:
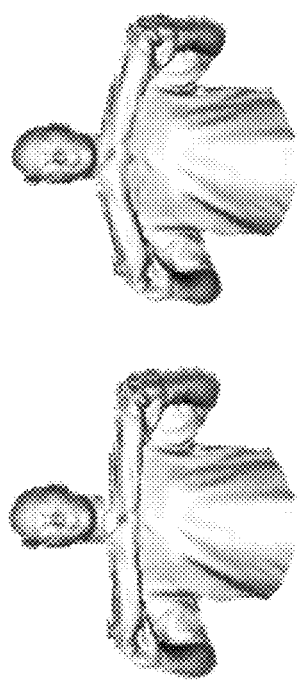
Figure 16D:

FIGS. 16A-16D show results on real data with topology changes. FIG. 16A shows RGB images of a starting frame and live frame for reference; and FIGS. 16B-16D show a comparison of the topology-change-aware volumetric fusion method described herein (FIG. 16B) with VolumeDeform (FIG. 16C) and KillingFusion (FIG. 16D), where the first row is a bread breaking sequence and the second row is a paper tearing sequence. It can be seen that VolumeDeform could not update geometry correctly while both KillingFusion and topology-change-aware volumetric fusion method described herein could handle topology changes. KillingFusion produces less smooth reconstructed surfaces as compared to topology-change-aware volumetric fusion method described herein, even though all three methods use the same resolution of TSDF volume.

An ablation study shows the effect of line process based registration, the effect of connectivity update, the effect of different resolutions.

Figure 17A:
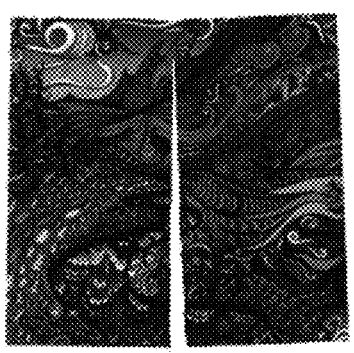
FIGS. 17A-17C show the effect of line process based registration.
Figure 17B:
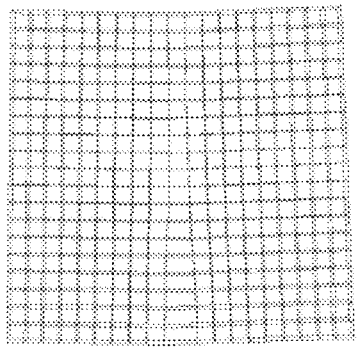
Figure 17C:
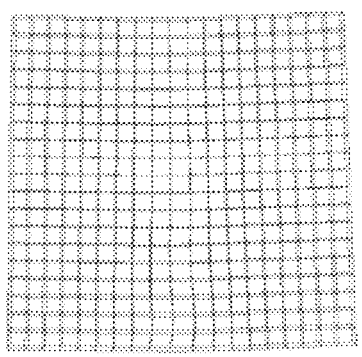

FIGS. 17A-17C show the effect of line process based registration. FIG. 17A shows a target point cloud; FIG. 17B shows registration with line process in the ARAP regularity term; and FIG. 17C shows registration without line process in the ARAP regularity term. It can be seen that FIG. 17B has a better registration result than FIG. 17C in the tearing part. The line process weights in FIG. 17B also indicate the discontinuity of edges, which help identifying cutting edges given a threshold.

Figure 18:
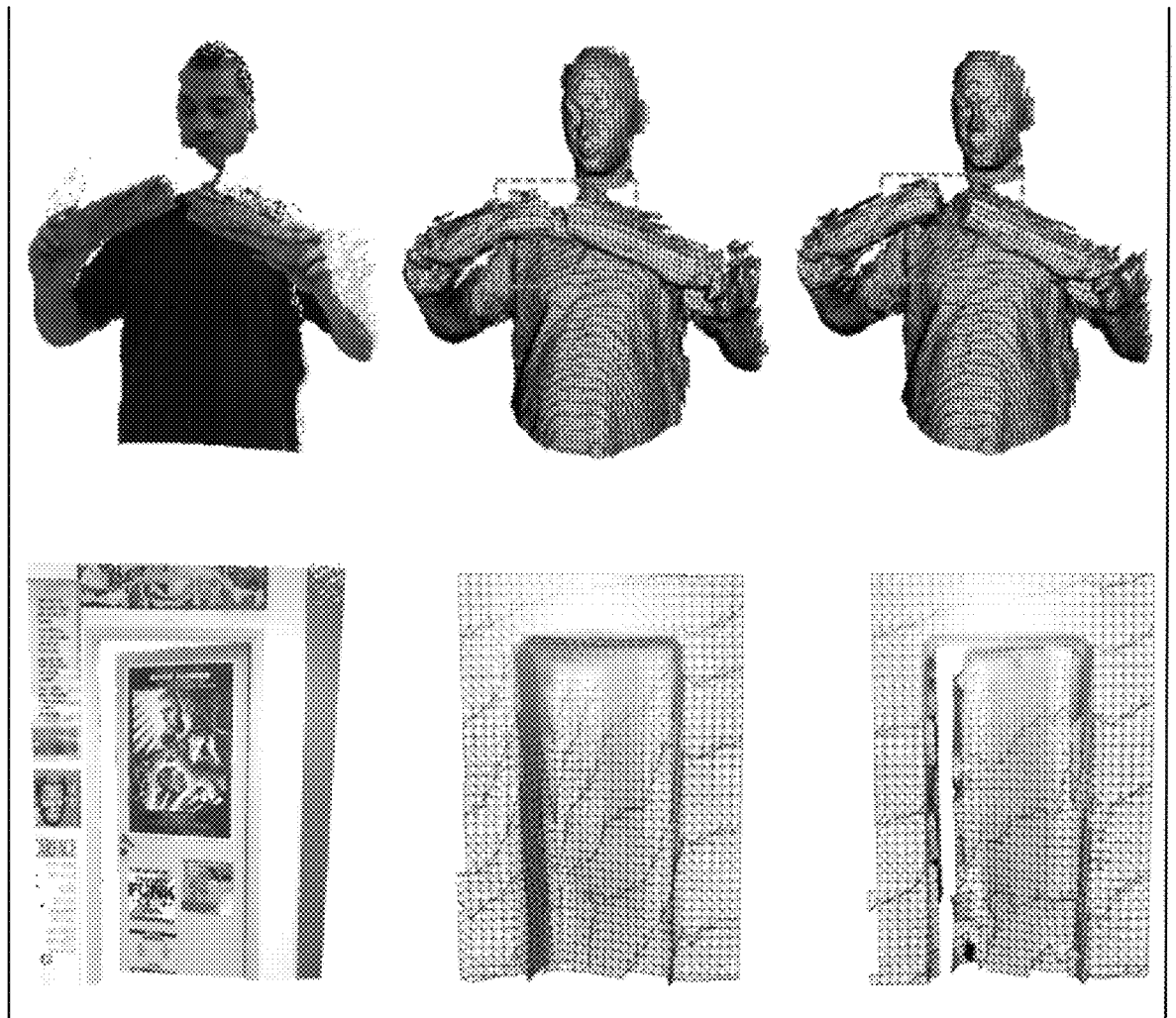
FIG. 18 demonstrates the effect of connectivity update.

FIG. 18 demonstrates the effect of connectivity update. Here, the left images are the input point cloud, the middle images are the results without connectivity update; and the right images are the results with connectivity update. Without the connectivity update, topology changes will not be correctly reconstructed even though the topology-change-aware registration described herein could help aligning surface towards the target point cloud.

Effect of different resolutions: As is known, a higher resolution of TSDF volume results in better reconstructed details and vice versa. Due to the assumption in the method described herein of all cutting edges being cut in mid-points, lower resolution of EDG may cause inaccurate cutting positions, for example making the tearing boundary towards a line. However, there are two ways to alleviate such an effect: 1) Increasing the resolution of EDG; 2) the use of multi-level grids and the described connectivity propagation algorithm (that propagates the EDG connectivity to the TSDF volume). Moreover, although EDG may be given a lower resolution, by using a higher resolution of TSDF, it is possible to complement the lower resolution EDG by reconstructing more detailed geometry. In the bread breaking and paper tearing sequences, the voxel resolution is 6 mm while cell resolution is 30 mm.

It should be understood that although the example implementation runs at around 5 FPS, it is possible to improve speeds by using parallel computation and by performing code optimization.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
    detecting one or more topology changes between reconstructed frames and a new incoming frame, wherein the reconstructed frames produce a first surface mesh, a first deformation grid, and a first volumetric cell structure representing a canonical volume reconstructed from images of previous frames, and wherein the one or more topology changes are detected as a set of discontinuities in the first surface mesh;
    duplicating cells of the first volumetric cell structure at the set of discontinuities to generate a set of nodes, wherein the set of nodes have a non-manifold connectivity; and
    fusing a depth image of the new incoming frame with the first volumetric cell structure having the set of nodes to form a next volumetric cell structure, wherein the new incoming frame produces a next surface mesh, a next deformation grid, and the next volumetric cell structure.

2. The method of claim 1, further comprising:
    outputting the next surface mesh for rendering a live frame by a virtual reality, augmented reality, gaming, or meeting application.

3. The method of claim 1, wherein the first deformation grid and the first volumetric cell structure have identical volumetric structures; and the next deformation grid and the next volumetric cell structure have identical volumetric structures.

4. The method of claim 1, wherein the first deformation grid has a lower resolution than that of the first volumetric cell structure; and the next deformation grid has a lower resolution than the next volumetric cell structure.

5. The method of claim 1, wherein the first volumetric cell structure is a truncated signed distance field (TSDF) grid and the first deformation grid is an embedded deformation graph (EDG).

6. The method of claim 1, wherein the detecting of the one or more topology changes between the reconstructed frames and the new incoming frame uses the first deformation grid, including calculating, for the new incoming frame, a change in rotation and translation from the first deformation grid.

7. The method of claim 1, wherein the detecting of the one or more topology changes between the reconstructed frames and the new incoming frame comprises:
    performing a line process based deformation estimation.

8. The method of claim 7, wherein performing the line process based deformation estimation comprises:
    performing a rigid alignment to compute inter-frame global rotation and global translation; and
    performing a deformable alignment that incorporates a line process parameter to account for discontinuities between neighboring nodes.

9. The method of claim 7, wherein duplicating cells of the first volumetric cell structure at the set of discontinuities to generate the set of nodes comprises:
    updating the first volumetric cell structure based on the deformation estimation by propagating connectivity of the next deformation grid to the first volumetric cell structure.

10. The method of claim 1, further comprising updating connectivity of the first deformation grid based on the one or more topology changes to generate the next deformation grid.

11. The method of claim 10, wherein updating connectivity of the first deformation grid based on the one or more topology changes to generate the next deformation grid comprises:
- receiving a set of cutting edges in the first deformation grid corresponding to the set of discontinuities and a set of candidate cells to be duplicated based on the set of cutting edges;
- removing the cutting edges from the first deformation grid and computing candidate cell connected components;
- duplicating cells of the first deformation grid based on the connected components, forming real first nodes and virtual first nodes for the cells; and
- restoring connectivity to generate the next deformation grid.

12. The method of claim 10, wherein duplicating cells of the first volumetric cell structure at the set of discontinuities to generate the set of nodes comprises:
- propagating connectivity of the next deformation grid to the first volumetric cell structure.

13. A system for real-time dynamic 4D reconstruction of image scenes, comprising:
- a processing system;
- a storage system; and
- fusion code stored in the storage system that, when executed by the processing system, directs the system for real-time dynamic 4D reconstruction of image scenes to:
  - receive a new RGB-D image including a color image and a depth image of a new incoming frame, a color image from a previous frame, and a previous surface mesh extracted from a canonical volume deformed by the previous frame;
  - perform a topology-change-aware registration process, including detecting one or more topology changes between reconstructed frames and the new incoming frame, to output a registered surface mesh deformed to the images of the new incoming frame and an estimated deformation field, wherein the one or more topology changes are detected as a set of discontinuities in the previous surface mesh; and
  - perform an image fusion process to update the canonical volume using the registered surface mesh deformed to the images of the new incoming frame, the estimated deformation field, the depth image of the new incoming frame, and the canonical volume deformed by the previous frame, the image fusion process including duplicating cells of the canonical volume deformed by the previous frame at the set of discontinuities and fusing the depth image of the new incoming frame with the canonical volume deformed by the previous frame.

14. The system of claim 13, wherein the canonical volume comprises a truncated signed distance field (TSDF) grid comprising at least one non-manifold connected feature; and the estimated deformation field comprises a corresponding embedded deformation graph (EDG) comprising at least one non-manifold connected feature.

15. The system of claim 14, wherein the TSDF and the corresponding EDG have identical volumetric structures.

16. The system of claim 14, wherein the EDG has a lower resolution than that of the TSDF.

* * * * *